(12) United States Patent
Chae et al.

(10) Patent No.: US 7,417,705 B2
(45) Date of Patent: Aug. 26, 2008

(54) LIQUID CRYSTAL DISPLAY DEVICE AND METHOD FOR FABRICATING THE SAME

(75) Inventors: Gee Sung Chae, Incheon-kwangyokshi (KR); Woo Hyun Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/000,919

(22) Filed: Dec. 18, 2007

(65) Prior Publication Data

US 2008/0106684 A1    May 8, 2008

Related U.S. Application Data

(62) Division of application No. 10/879,573, filed on Jun. 29, 2004, now Pat. No. 7,327,431.

(30) Foreign Application Priority Data

Dec. 29, 2003    (KR) .................. 10-2003-0098941

(51) Int. Cl.
*G02F 1/1339* (2006.01)
(52) U.S. Cl. .......................................... 349/156
(58) Field of Classification Search .................. 349/156
See application file for complete search history.

(56) References Cited

U.S. PATENT DOCUMENTS

| | | | |
|---|---|---|---|
| 6,433,852 B1 | 8/2002 | Sonoda et al. | |
| 6,549,260 B1 | 4/2003 | Shibahara | |
| 6,657,699 B2 | 12/2003 | Matsumoto | |
| 6,690,445 B2 | 2/2004 | Matsumoto | |
| 2003/0058399 A1 | 3/2003 | Miyashita | |
| 2005/0140889 A1 | 6/2005 | Matsumoto | |

FOREIGN PATENT DOCUMENTS

| | | |
|---|---|---|
| JP | 2001-073809 | 3/1998 |
| JP | 10-228022 | 8/1998 |
| JP | 11-153816 | 6/1999 |
| JP | 2001-311952 | 11/2001 |
| KR | 10-0275298 | 12/2000 |
| KR | 10-2002-0081133 | 10/2002 |

*Primary Examiner*—David C. Nelms
*Assistant Examiner*—Phu Vu
(74) *Attorney, Agent, or Firm*—McKenna, Long & Aldridge LLP

(57) ABSTRACT

A liquid crystal display (LCD) device and a method for fabricating the same is disclosed, to obtain high aperture ratio and to solve the problem due to the force of gravity, which includes first and second substrates facing each other at a predetermined distance; gate and data lines crossing each other on the first substrate, to define a pixel region; a first common line substantially parallel to the gate line; a thin film transistor where the gate and data lines cross; a first insulating interlayer on an entire surface of the first substrate including the thin film transistor; an insulating layer having walls above the gate and data lines; a second common line and a common electrode in the pixel region extending in one direction, and overlapping with the gate line, the data line and the thin film transistor; and a pixel electrode in contact with a drain electrode of the thin film transistor and between the common electrodes of the pixel region at fixed intervals.

9 Claims, 26 Drawing Sheets

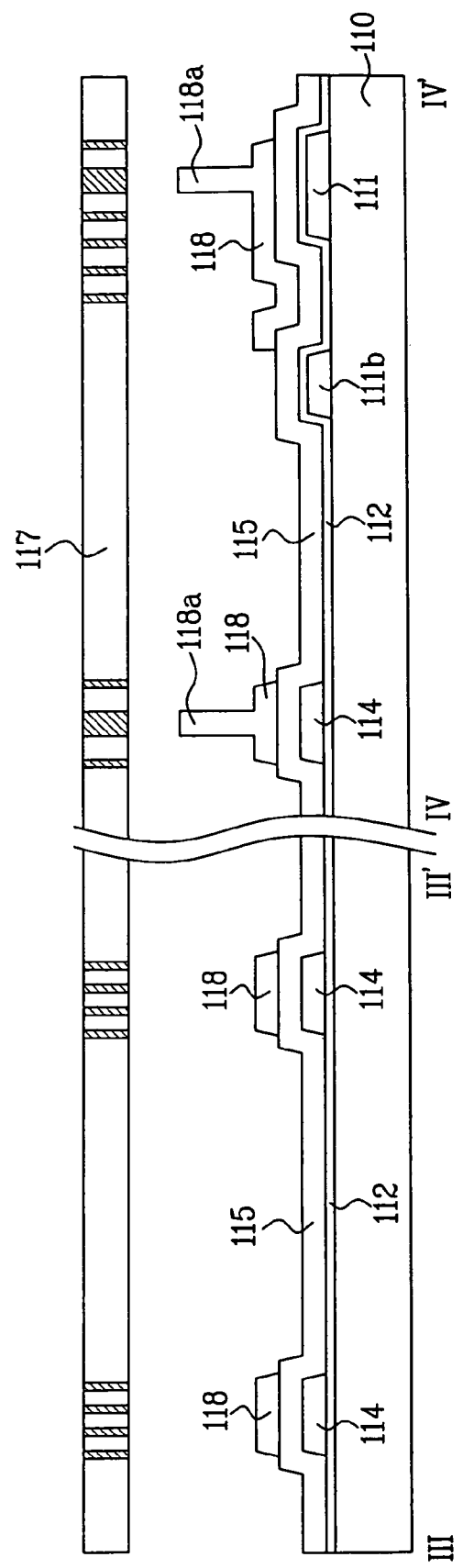

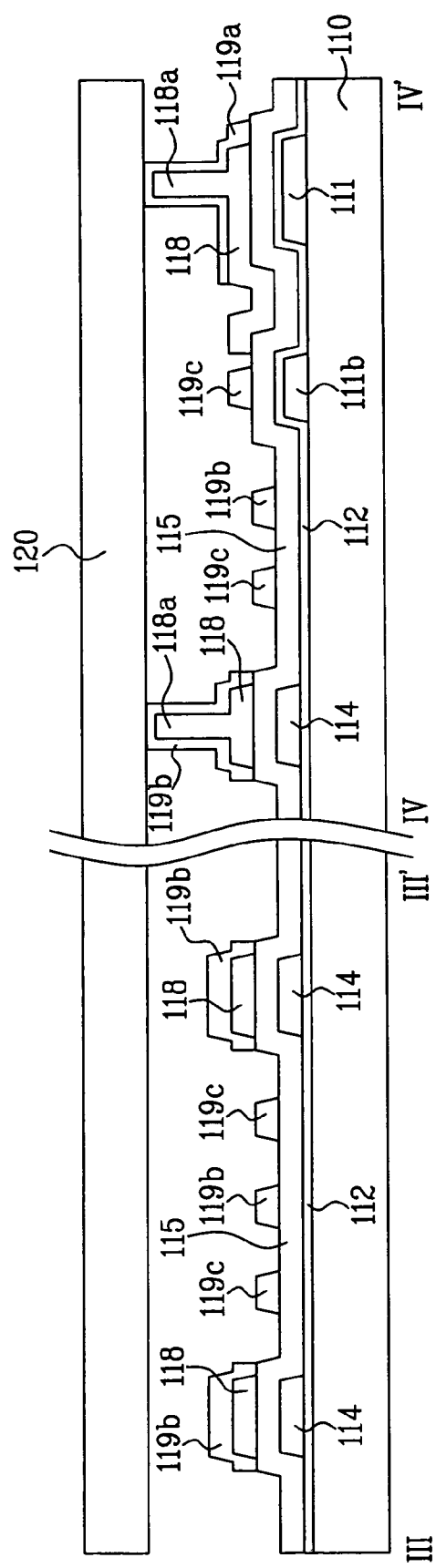

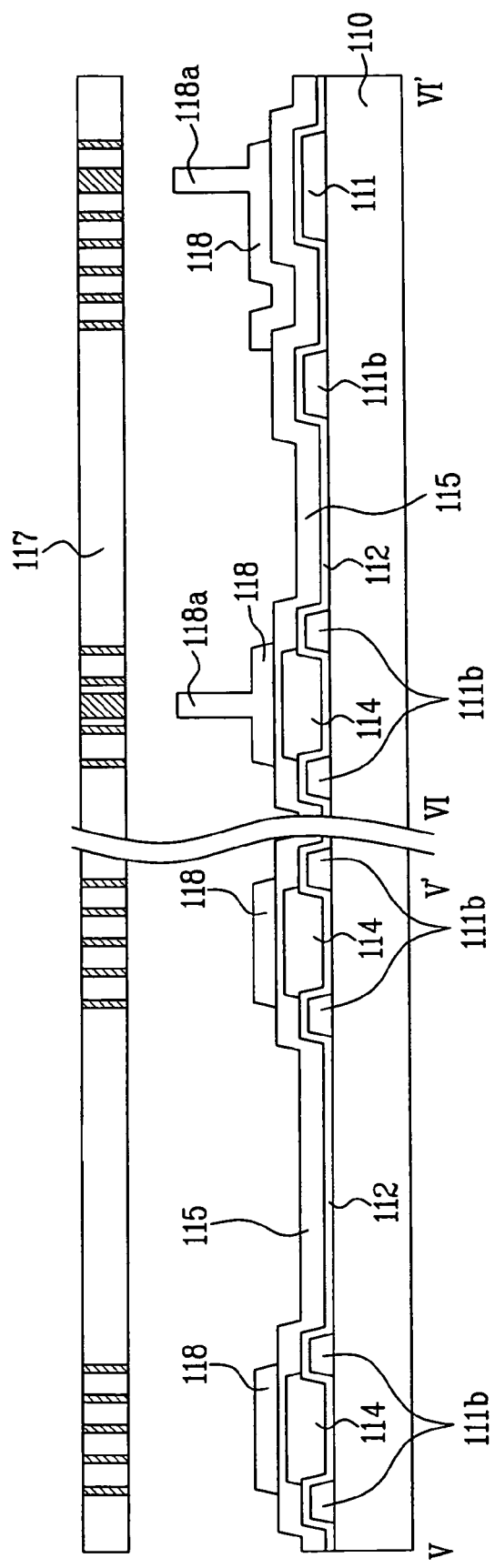

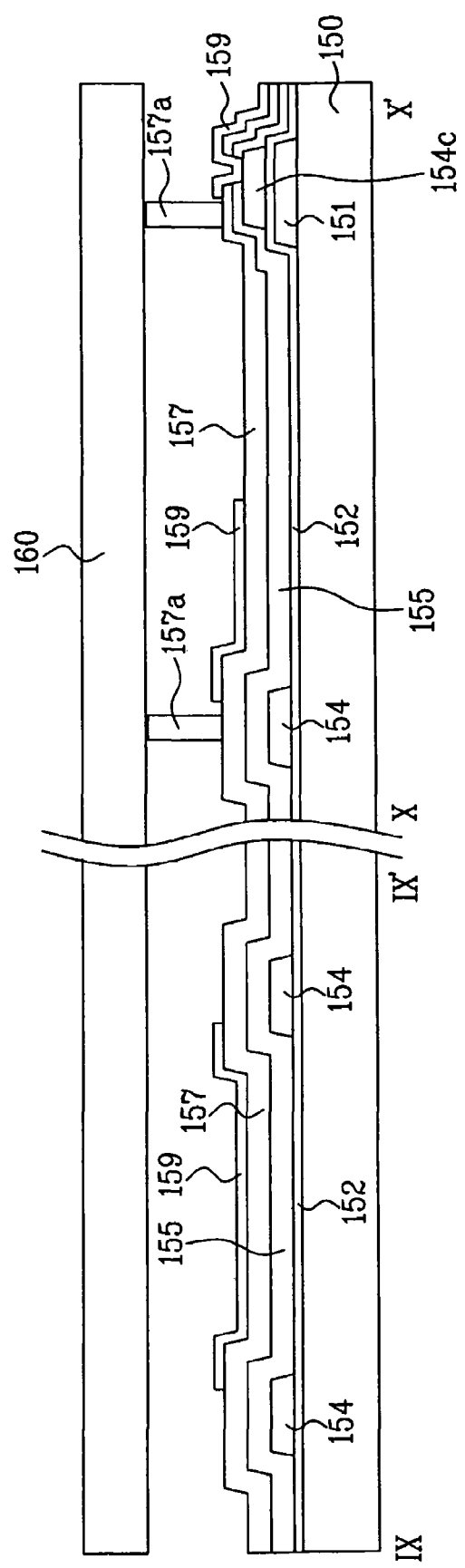

LIQUID CRYSTAL DISPLAY DEVICE AND METHOD FOR FABRICATING THE SAME

This is a divisional application of application Ser. No. 10/879,573 filed Jun. 29, 2004 now U.S. Pat. No. 7,327,431 which claims the benefit of Korean Patent Application No. 10-2003-0098941 filed Dec. 29, 2003, which are hereby incorporated by reference for all purposes as if fully set forth herein.

BACKGROUND OF THE INVENTION

1. Field of the Invention

The present invention relates to a liquid crystal display (LCD) device, and more particularly, to a liquid crystal display (LCD) device and a method for fabricating the same, to obtain high aperture ratio and solve the problem by using the force of gravity.

2. Discussion of the Related Art

Demands for various display devices have increased with the development of an information society. Accordingly, many efforts have been made to research and develop various flat display devices such as liquid crystal displays (LCD), plasma display panels (PDP), electroluminescent displays (ELD), and vacuum fluorescent displays (VFD). Some species of flat display devices have already been applied to displays for various equipment.

Among the various flat display devices, liquid crystal display (LCD) devices have been most widely used due to advantageous characteristics of a thin profile, lightweight, and low power consumption, whereby the LCD devices provide a substitute for a cathode ray tube (CRT). In addition to mobile type LCD devices such as displays for a notebook computer, LCD devices have been developed for computer monitors and televisions to receive and display broadcasting signals.

Despite various technical developments in LCD technology having applications in different fields, research for enhancing the picture quality of the LCD device has been, in some respects, lacking as compared to other features and advantages of the LCD device. In order to use LCD devices in various fields as a general display, it is important that LCD devices have a high quality picture, such as high resolution and high luminance with a large-sized screen, while still maintaining a light weight, a thin profile, and low power consumption.

A general LCD device includes an LCD panel for displaying a picture image, and a driving part for applying a driving signal to the LCD panel. The LCD panel includes first and second glass substrates being bonded to each other at a predetermined interval therebetween, and a liquid crystal layer injected between the first and second glass substrates.

The first glass substrate (TFT array substrate) includes a plurality of gate and data lines, a plurality of pixel electrodes, and a plurality of thin film transistors. At this time, the plurality of gate lines are formed on the first glass substrate at fixed intervals, and the plurality of data lines are formed substantially perpendicular to the plurality of gate lines at fixed intervals. Then, the plurality of pixel electrodes, arranged in a matrix-type configuration, are respectively formed in pixel regions defined by the plurality of gate and data lines crossing each other. The plurality of thin film transistors are switched according to signals on the gate lines to transmit signals from the data lines to the respective pixel electrodes.

The second glass substrate (color filter substrate) includes a black matrix layer that blocks light from regions of the display, except the pixel regions of the first substrate, R/G/B color filter layer for displaying various colors, and a common electrode to obtain the picture image. For an In-Plane Switching (IPS) mode LCD device, the common electrode is formed on the first glass substrate.

Next, a predetermined space is maintained between the first and second glass substrates by spacers, and the first and second substrates are bonded to each other by a seal pattern having a liquid crystal injection inlet. At this time, the liquid crystal layer is formed according to a liquid crystal injection method, in which the liquid crystal injection inlet is dipped into a vessel having liquid crystal while maintaining a vacuum state in the predetermined space between the first and second glass substrates. That is, the liquid crystal is injected between the first and second substrates by an osmotic action. Then, the liquid crystal injection inlet is sealed with a sealant.

Meanwhile, the LCD device is driven according to the optical anisotropy and polarization of liquid crystal material. Liquid crystal molecules are aligned using directional characteristics because the liquid crystal molecules each has long and thin shapes. An induced electric field may be applied to the liquid crystal to control the alignment direction of the liquid crystal molecules. If the alignment direction of the liquid crystal molecules is controlled by the induced electric field, the light is polarized and changed by the optical anisotropy of the liquid crystal, thereby displaying a picture image. In this state, the liquid crystal is classified into positive (+) type liquid crystal having positive dielectric anisotropy and negative (−) type liquid crystal having negative dielectric anisotropy according to electrical characteristics of the liquid crystal. In the positive (+) type liquid crystal, a longitudinal (major) axis of a positive (+) liquid crystal molecule is in parallel to the electric field applied to the liquid crystal. Meanwhile, in the negative (−) type liquid crystal, a longitudinal (major) axis of a negative (−) liquid crystal molecule is perpendicular to the electric field applied to the liquid crystal.

FIG. 1 is an exploded perspective view illustrating a general Twisted Nematic (TN) mode LCD device. As shown in FIG. 1, the TN mode LCD device includes a lower substrate 1 and an upper substrate 2 bonded to each other with a predetermined interval therebetween, and a liquid crystal layer 3 injected between the lower and upper substrates 1 and 2.

More specifically, the lower substrate 1 includes a plurality of gate lines 4, a plurality of data lines 5, a plurality of pixel electrodes 6, and a plurality of thin film transistors T. The plurality of gate lines 4 are formed on the lower substrate 1 in one direction at fixed intervals, and the plurality of data lines 5 are formed substantially perpendicular to the plurality of gate lines 4 at fixed intervals, thereby defining a plurality of pixel regions P. Then, the plurality of pixel electrodes 6 are respectively formed in the pixel regions P defined by the plurality of gate and data lines 4 and 5 crossing each other, and the plurality of thin film transistors T are respectively formed at crossing portions of the plurality of gate and data lines 4 and 5. The upper substrate 2 includes a black matrix layer 7 that blocks light from regions of the display except the pixel regions P, R/G/B color filter layers 8 for displaying various colors, and a common electrode 9 for displaying a picture image.

At this time, the thin film transistor T includes a gate electrode, a gate insulating layer (not shown), an active layer, a source electrode, and a drain electrode. The gate electrode projects from the gate line 4, and the gate insulating layer (not shown) is formed on an entire surface of the lower substrate. Then, the active layer is formed on the gate insulating layer above the gate electrode. The source electrode projects from the data line 5, and the drain electrode is formed opposite of the source electrode. Also, the aforementioned pixel electrode 6 is formed of transparent conductive metal having great transmittance, such as ITO (Indium-Tin-Oxide).

In the aforementioned LCD device, liquid crystal molecules of the liquid crystal layer 3 on the pixel electrode 6 are aligned with a signal applied from the thin film transistor T, and light transmittance is controlled according to the alignment of liquid crystal, thereby displaying the picture image. In this state, an LCD panel drives the liquid crystal molecules by an electric field perpendicular to the lower and upper substrates. This method results in great transmittance and high aperture ratio. Also, it is possible to prevent liquid crystal cells from being damaged by static electricity because the common electrode 9 of the upper substrate 2 serves as the ground. However, in the case of driving the liquid crystal molecules by the electric field perpendicular to the lower and upper substrates, it is difficult to obtain a wide viewing angle.

In order to overcome these problems, an In-Plane Switching (IPS) mode LCD device has recently been developed. Hereinafter, the related art IPS mode LCD device will be described with reference to the accompanying drawings. FIG. 2 is a cross-sectional view schematically illustrating the related art IPS mode LCD device. In the related art IPS mode LCD device, as shown in FIG. 2, a common electrode 13 and a pixel electrode 12 are formed on the same plane of a lower substrate 11. Then, the lower substrate 11 is bonded to an upper substrate 15 with a predetermined interval therebetween, and liquid crystal 14 is formed between the lower and upper substrates 11 and 15. The liquid crystal 14 is driven by an electric field formed between the common electrode 13 and the pixel electrode 12 on the lower substrate 11.

FIG. 3A and FIG. 3B illustrate the alignment direction of liquid crystal when a voltage is turned on/off in the related art IPS mode LCD device.

FIG. 3A illustrates the related art IPS mode LCD device when the voltage is turned off. That is, an electric field parallel to the lower and upper substrates is not applied to the common electrode 13 or the pixel electrode 12. Accordingly, there is no change in alignment of the liquid crystal 14. For example, liquid crystal molecules are basically twisted at 45° to a horizontal direction of the pixel electrode 12 and the common electrode 13.

FIG. 3B illustrates the related art IPS mode LCD device when the voltage is turned on. That is, the electric field parallel to the lower and upper substrates is applied to the common electrode 13 and the pixel electrode 12, thereby changing the alignment of the liquid crystal 14. In more detail, the alignment of liquid crystal 14 is twisted more at 45° as compared to the alignment of liquid crystal when the voltage is turned off. In this state, the horizontal direction of the common and pixel electrodes 13 and 12 is identical to the twisted direction of liquid crystal.

As mentioned above, the related art IPS mode LCD device has the common electrode 13 and the pixel electrode 12 on the same plane. Thus, it has advantageous characteristics such as a wide viewing angle. For example, along a front direction of the IPS mode LCD device, a viewer may have a viewing angle of 70° in all directions (i.e., lower, upper, left, and right directions). Furthermore, the related art IPS mode LCD device has simplified fabrication process, and reduced color shift. However, the related art IPS mode LCD device has the problems of low light transmittance and low aperture ratio because the common electrode 13 and the pixel electrode 12 are formed on the same substrate. Also, it is necessary to improve the response time of the driving voltage, and to maintain the uniform cell gap due to the small misalignment margin for the cell gap. That is, the IPS mode LCD device has the aforementioned advantages and disadvantages, whereby a user can select the mode of the LCD device to achieve a desired purpose.

FIG. 4A and FIG. 4B are perspective views illustrating the operation of the IPS mode LCD device on the turning on/off state. Referring to FIG. 4A, when a voltage is not supplied to the pixel electrode 12 or the common electrode 13, the alignment direction 16 of the liquid crystal molecules is identical to the alignment direction of an initial alignment layer (not shown). Then, as shown in FIG. 4B, when the voltage parallel to substrates is supplied to the pixel electrode 12 and the common electrode 13, the alignment direction 16 of the liquid crystal molecules corresponds to an electric field application direction 17.

Hereinafter, a related art LCD device will be described with reference to the accompanying drawings.

FIG. 5 is a plan view illustrating a related art IPS mode LCD device. FIG. 6 is a cross-sectional view taken along lines I-I' and II-II' of FIG. 5.

In the related art LCD device, as shown in FIG. 5 and FIG. 6, a transparent lower substrate 100 includes a gate line 101, a gate electrode 101a, a first common line 101b, a gate insulating layer 102, an active layer 103, a data line 104, a source electrode 104a, a drain electrode 104b, a storage electrode 104c, a planarization layer 105, a contact hole 106, a second common line 107a, a common electrode 107b, and a pixel electrode 107c.

The gate line 101 is formed on the transparent lower substrate 100 in one direction, and the gate electrode 101a protrudes from one portion of the gate line 101. Also, the first common line 101b is formed of the same material and on the same layer as the gate line 101, and the gate insulating layer 102 is formed on an entire surface of the lower substrate 100 including the gate electrode 101a and the first common line 101b. Then, the island-shaped active layer 103 is formed on the gate insulating layer 102 above the gate electrode 101a. After that, the data line 104 is formed substantially perpendicular to the gate line 101, to define a pixel region. The source electrode 104a protruding from the data line 104 is overlapped with one side of the active layer 103, and the drain electrode 104b is overlapped with the other side of the active layer 103 at a predetermined distance from the source electrode 104a. Then, the storage electrode 104c is formed above the first common line 101b, and the planarization layer 105 is formed on the entire surface of the lower substrate 100 including the data line 104, the source electrode 104a and the drain electrode 104b. Also, the contact hole 106 exposing one portion of the drain electrode 104b is formed in the planarization layer 105. The second common line 107a is formed in the planarization layer 105 of the lower substrate 100 including the source electrode 104a and the drain electrode 104b, and the common electrode 107b is formed as one with the second common line 107a above the data line 104 and in one portion of the pixel region. Then, the pixel electrode 107c is in contact with the drain electrode 104b through the contact hole 106, and formed between the common electrodes 107b at fixed intervals.

Next, an upper substrate 90 is formed in opposite to the lower substrate 100. The upper substrate 90 includes a black matrix layer 91 that blocks light from regions of the display except the pixel regions of the lower substrate 100, and R/G/B color filter layers 92 (not shown) corresponding to the pixel regions. In consideration of the bonding margin of the upper and lower substrates in the area corresponding to a thin film transistor TFT, the black matrix layer 91 of the upper substrate 90 has a large space.

Thereafter, a column spacer 80 is formed in the area corresponding to the gate or data line to maintain a cell gap when bonding the upper and lower substrates 90 and 100. At this time, the column spacer 80 may be formed on any one of the upper and lower substrates 90 and 100.

However, the related art LCD device has the following disadvantages. It is possible to obtain the high aperture ratio in the related art LCD device. However, as the LCD panel becomes large, the liquid crystal flows in all directions of the upper/lower/left/right side in the LCD panel, thereby generating spots on a screen.

SUMMARY OF THE INVENTION

Accordingly, the present invention is directed to a liquid crystal display (LCD) device and a method for fabricating the same that substantially obviates one or more problems due to limitations and disadvantages of the related art.

An advantage of the present invention is to provide a liquid crystal display (LCD) device and a method for fabricating the same, to obtain high aperture ratio and to solve the problem by the force of gravity.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a liquid crystal display (LCD) device includes first and second substrates facing each other at a predetermined distance; gate and data lines crossing each other on the first substrate, to define a pixel region; a first common line substantially parallel to the gate line; a thin film transistor where the gate and data lines cross; a first insulating interlayer on an entire surface of the first substrate including the thin film transistor; an insulating layer having walls above the gate and data lines; a second common line and a common electrode in the pixel region extending in one direction and overlapping with the gate line, the data line and the thin film transistor; and a pixel electrode in contact with a drain electrode of the thin film transistor and between the common electrodes of the pixel region at fixed intervals.

The walls of the insulating layer may be formed above the gate line at the lower side of the pixel region and some portions of the both data lines adjacent thereto.

Also, the insulating layer having the walls may be formed of an organic insulating layer having a low dielectric constant, including one of photo acryl, polyimide, and BCB (BenzoCycloButene).

Also, the wall may be formed at a height corresponding to a cell gap.

Also, the wall of the insulating layer may be formed as one pixel unit, or several tens to hundreds of pixel units.

Also, the common electrode may be formed in the same direction as the insulating layer having the walls above the data line, and the data line in one portion of the pixel region.

Also, the second common line, the common electrode, and the pixel electrode may be formed on the same layer.

Also, the second common line, the common electrode, and the pixel electrode may be formed of ITO (Indium-Tin-Oxide), TO (Tin-Oxide), IZO (Indium-Zinc-Oxide) or ITZO (Indium-Tin-Zinc-Oxide).

Furthermore, the LCD device may include a storage electrode extending from the drain electrode on the first common line.

Also, the pixel electrode may be in contact with the drain electrode and the storage electrode.

In another aspect, a liquid crystal display (LCD) device includes first and second substrates facing each other; gate and data lines crossing each other on the first substrate, to define a pixel region; a first common line parallel to the gate line on the same layer, and formed along both lower sides of the adjacent data line at fixed intervals; a thin film transistor where the gate and data lines cross; a first insulating interlayer on an entire surface of the first substrate including the thin film transistor; an insulating layer having walls above the gate and data lines; a second common line and a common electrode in the pixel region extending in one direction and overlapping with the gate line, the data line and the thin film transistor; and a pixel electrode in contact with a drain electrode of the thin film transistor and between the common electrodes at fixed intervals.

At this time, the walls may be formed above the gate line and the adjacent data line, to surround the lower side of the pixel region, each wall having a height corresponding to a cell gap.

Also, the insulating layer having the walls may be formed of an organic insulating layer having a low dielectric constant, including one of photo acryl, polyimide, and BCB (BenzoCycloButene).

In another aspect, a liquid crystal display (LCD) device includes first and second substrates facing each other at a predetermined distance; gate and data lines crossing each other on the first substrate, to define a pixel region; a first common line substantially parallel to the gate line; a thin film transistor where the gate and data lines cross; a first insulating interlayer on an entire surface of the first substrate including the thin film transistor; a second insulating interlayer on the entire surface of the first insulating interlayer; walls on the second insulating interlayer above the gate line and the adjacent data line, to surround the lower side of the pixel region; a second common line and a common electrode in the pixel region extending in one direction and overlapping the gate line, the data line, and the thin film transistor; and a pixel electrode in contact with a drain electrode of the thin film transistor and between the common electrodes at fixed intervals.

The insulating layer and the walls may be formed of an organic insulating layer having a low dielectric constant, including one of photo acryl, polyimide, and BCB (BenzoCycloButene).

In another aspect, a liquid crystal display (LCD) device includes first and second substrates facing each other at a predetermined distance; gate and data lines crossing each other on the first substrate, to define a pixel region; a thin film transistor where the gate and data lines cross; a first insulating interlayer on an entire surface of the first substrate including the thin film transistor; a second insulating interlayer on the entire surface of the first insulating interlayer; walls above the gate line and the adjacent data line, to surround the lower side of the pixel region; and a pixel electrode in contact with a drain electrode of the thin film transistor, within the pixel region.

The second insulating interlayer and the walls may be formed of an organic insulating layer having a low dielectric constant, including one of photo acryl, polyimide, and BCB (BenzoCycloButene).

In another aspect, a method for fabricating a liquid crystal display (LCD) device includes the steps of forming a gate line having a gate electrode at one side of a substrate; forming a first common line substantially parallel to the gate line; forming a gate insulating layer on an entire surface of the substrate including the gate line; forming an active layer above the gate electrode; forming a data line substantially perpendicular to the gate line, to define a pixel region; forming source and drain electrodes overlapping both sides of the active layer; forming a first insulating interlayer on the entire surface of the substrate including the data line; forming an insulating layer having walls above the gate and data lines; forming a second common line and a common electrode in the pixel region extending in one direction and overlapping the gate line, the data line, and the thin film transistor; and forming a pixel electrode in contact with a drain electrode of the thin film transistor and between the common electrodes at fixed intervals.

The process of forming the insulating layer having the walls may include the steps of depositing the insulating layer on the first insulating interlayer; and etching the insulating layer by using a diffraction exposure mask having a slit.

Also, in case of forming the insulating layer as a negative type, the diffraction exposure mask may have a closed part corresponding to the wall, and a slit pattern corresponding to the insulating layer, and a transmission part corresponding to the remaining portions.

Also, in case of forming the insulating layer as a positive type, the diffraction exposure mask may have a transmission part corresponding to the wall, a slit pattern corresponding to the insulating layer, and a closed part corresponding to the remaining portions.

Also, the wall of the insulating layer may have a height corresponding to a cell gap.

Also, the insulating layer having the walls may be formed using a printing method or a method using a soft mold.

Also, the insulating layer having the walls may be formed of an organic insulating layer having a low dielectric constant, including one of photo acryl, polyimide, and BCB (BenzoCycloButene).

Also, the second common line, the common electrode and the pixel electrode may be formed on the same layer, and formed of ITO (Indium-Tin-Oxide), TO (Tin-Oxide), IZO (Indium-Zinc-Oxide) or ITZO (Indium-Tin-Zinc-Oxide).

Also, the first common line may be parallel to the gate line on the same layer, and extends substantially perpendicular along both lower sides of the adjacent data line at fixed intervals.

In another aspect, a method for fabricating a liquid crystal display (LCD) device includes forming a gate line having a gate electrode at one side of a substrate; forming a first common line substantially parallel to the gate line; forming a gate insulating layer on an entire surface of the substrate including the gate line; forming an active layer above the gate electrode; forming a data line substantially perpendicular to the gate line, to define a pixel region; forming source and drain electrodes overlapping both sides of the active layer; forming a first insulating interlayer on the entire surface of the substrate including the data line; forming a second insulating interlayer on the entire surface of the first insulating interlayer; forming walls above the gate line and the adjacent data line to surround the lower side of the pixel region; forming a second common line and a common electrode in the pixel region extending in one direction and overlapping the gate line, the data line, and the thin film transistor; and forming a pixel electrode in contact with a drain electrode of the thin film transistor and between the common electrodes at fixed intervals.

The second insulating interlayer may be formed on the entire surface of the first insulating interlayer including the data line by a first printing method, and the walls are formed on the second insulating interlayer by a second printing method, each wall having a height corresponding to a cell gap.

Also, the second insulating interlayer and the walls may be formed of an organic insulating layer having a low dielectric constant, at least any one of photo acryl, polyimide, and BCB (BenzoCycloButene).

In another aspect, a method of fabricating a liquid crystal display (LCD) device includes forming a gate line having a gate electrode at one side of a substrate; forming a gate insulating layer on an entire surface of the substrate including the gate line; forming an active layer above the gate electrode; forming a data line substantially perpendicular to the gate line, to define a pixel region; forming source and drain electrodes overlapping both sides of the active layer; forming a first insulating interlayer on the entire surface of the substrate including the data line; forming a second insulating interlayer on the entire surface of the first insulating interlayer; forming walls above the gate line and the adjacent data line, to surround the lower side of the pixel region; and forming a pixel electrode in contact with a drain electrode of the thin film transistor and within the pixel region.

The second insulating interlayer may be the walls may be formed of an organic insulating layer having a low dielectric constant, including any one of photo acryl, polyimide, and BCB (BenzoCycloButene).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9A to FIG. 9C are cross-sectional views illustrating the fabrication process of an LCD device according to the first embodiment of the present invention;

FIG. 12A to FIG. 12C are cross-sectional views illustrating the fabrication process of an LCD device according to the second embodiment of the present invention;

FIG. 18A to FIG. 18C are cross-sectional views illustrating the fabrication process of an LCD device according to the fourth embodiment of the present invention.

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, a liquid crystal display (LCD) device according to the preferred embodiments of the present invention and a method for fabricating the same will be described with reference to the accompanying drawings.

First Embodiment

Figure 1:
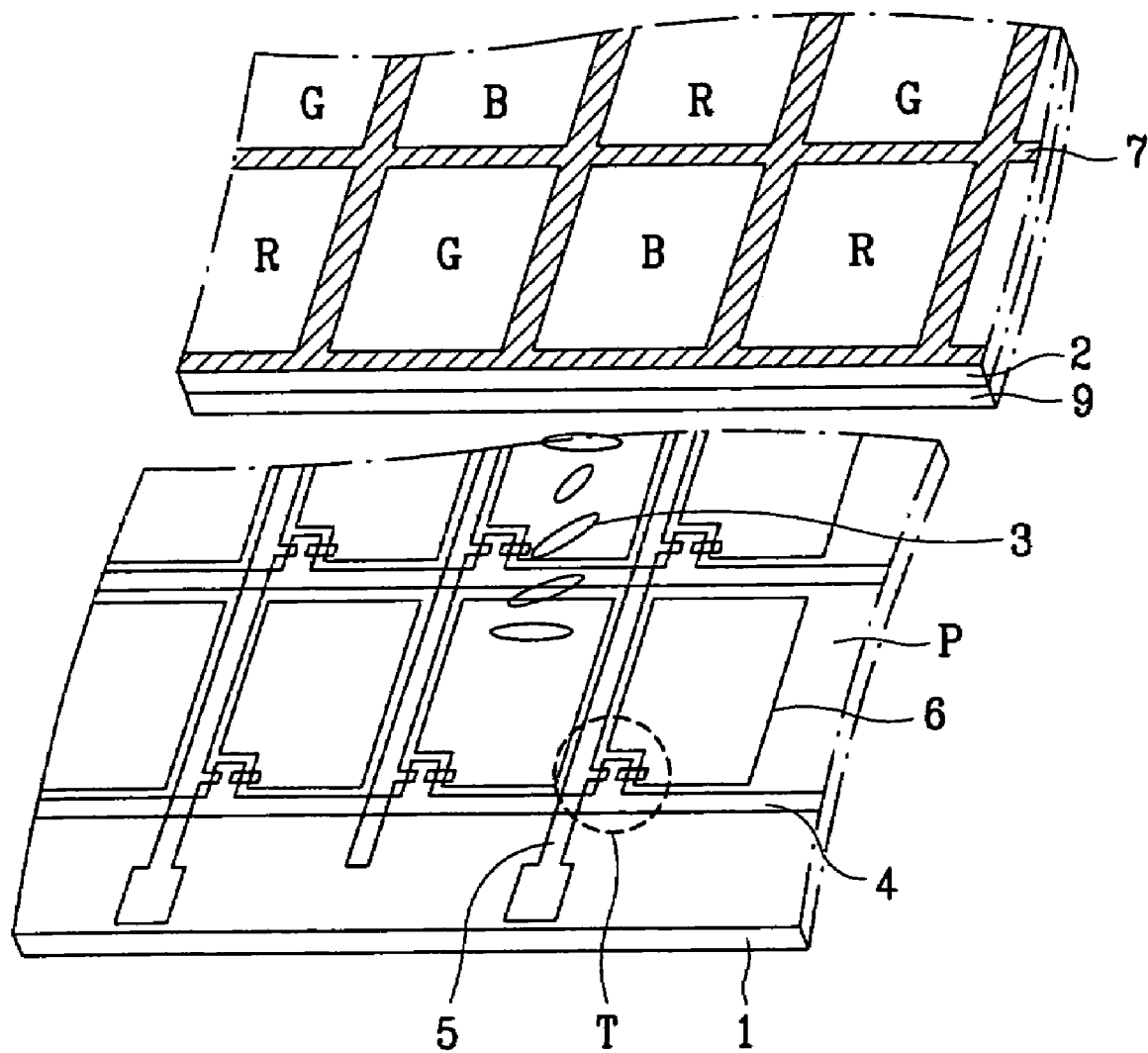
FIG. 1 is an exploded perspective view illustrating some portions of a general TN mode LCD device.
Figure 2:
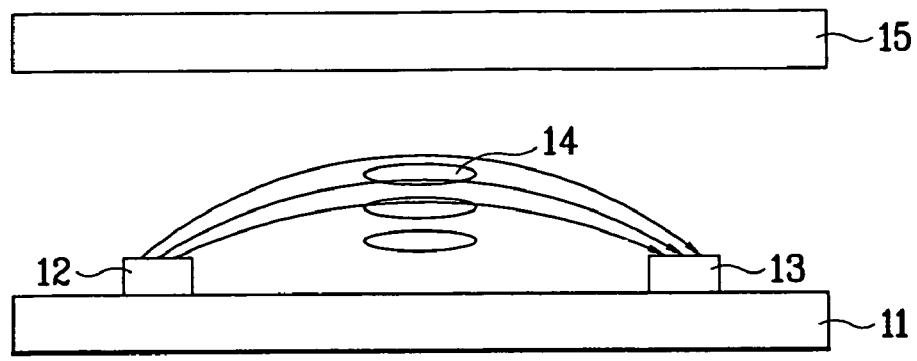
FIG. 2 is a cross-sectional view schematically illustrating a general IPS mode LCD device.
Figure 3A:
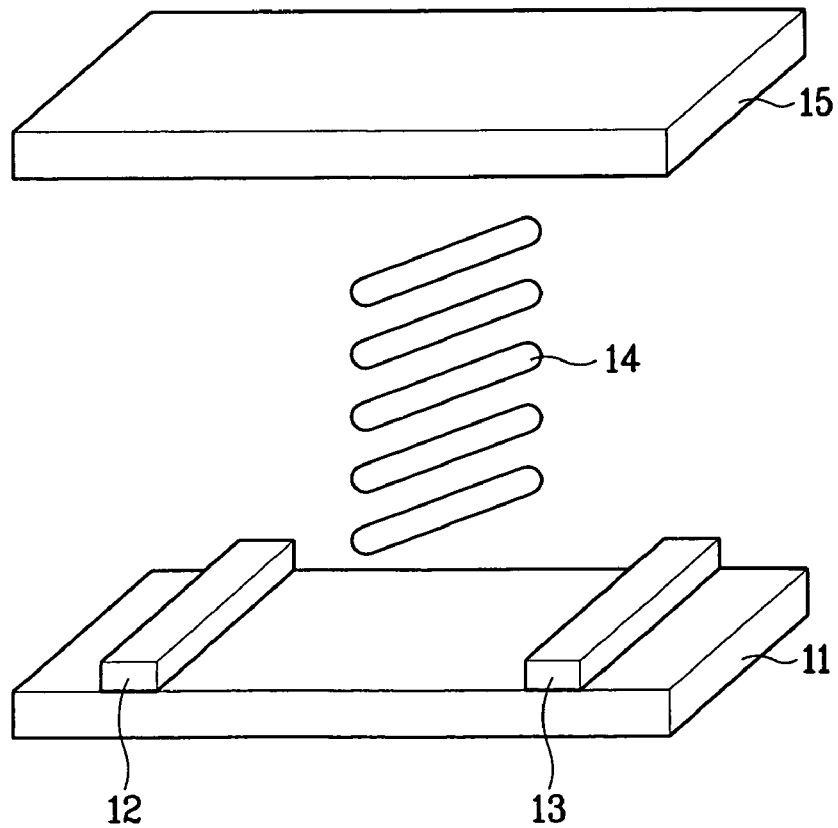
FIG. 3A and FIG. 3B illustrate phase change of liquid crystal when turning on/off an IPS mode LCD device.
Figure 3B:
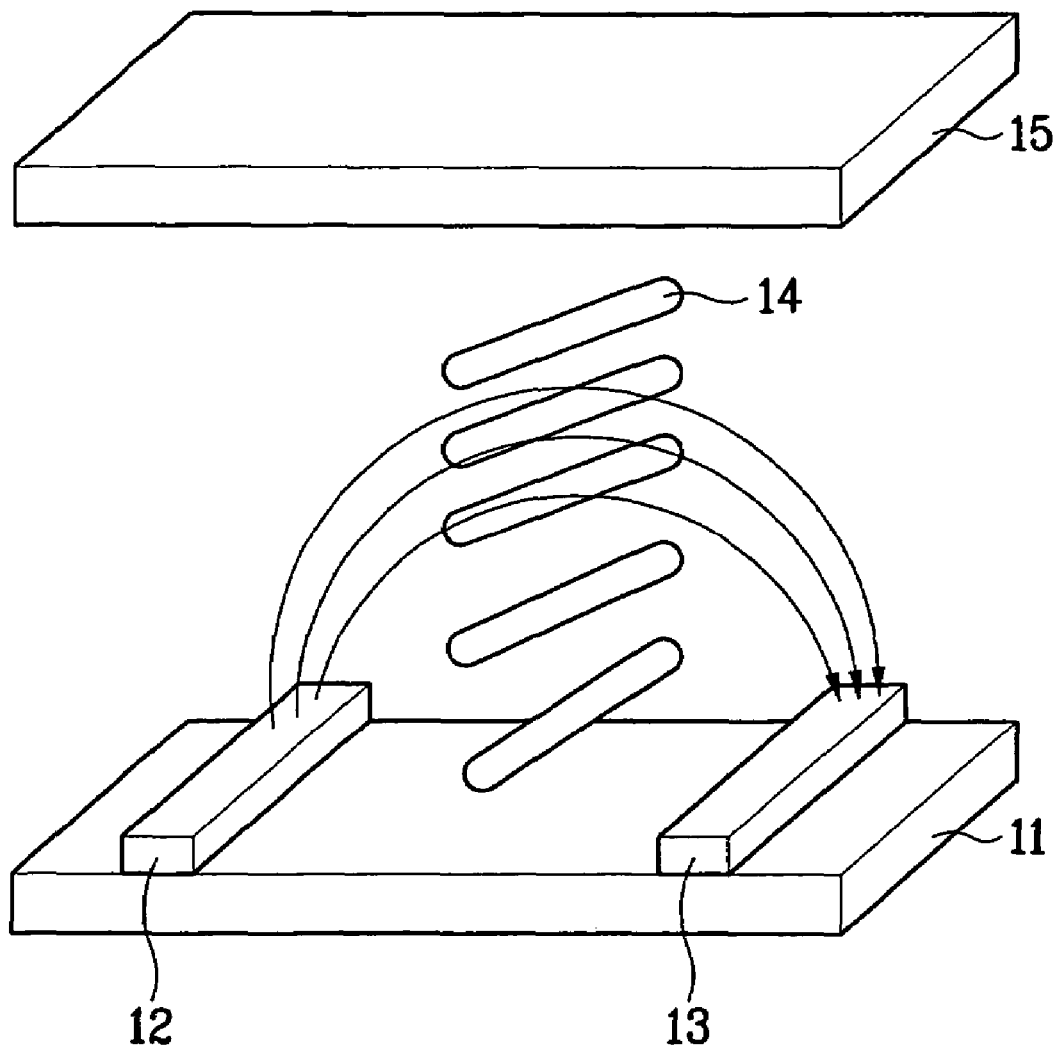
Figure 4A:
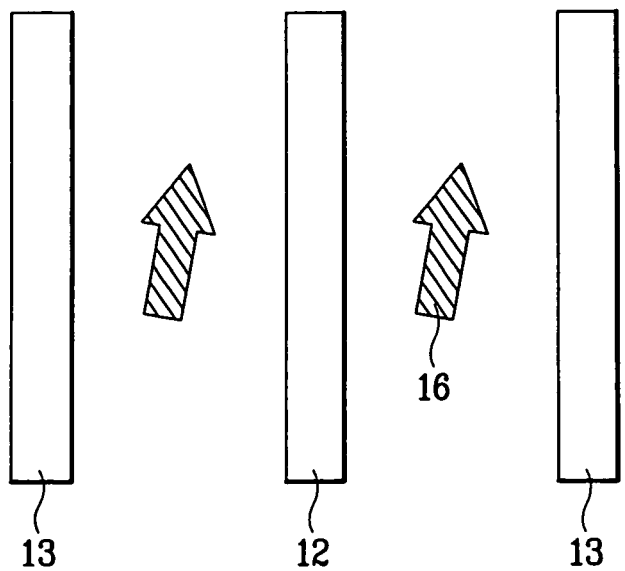
FIG. 4A and FIG. 4B are perspective views illustrating operation of an IPS mode LCD device on turning on/off state.
Figure 4B:
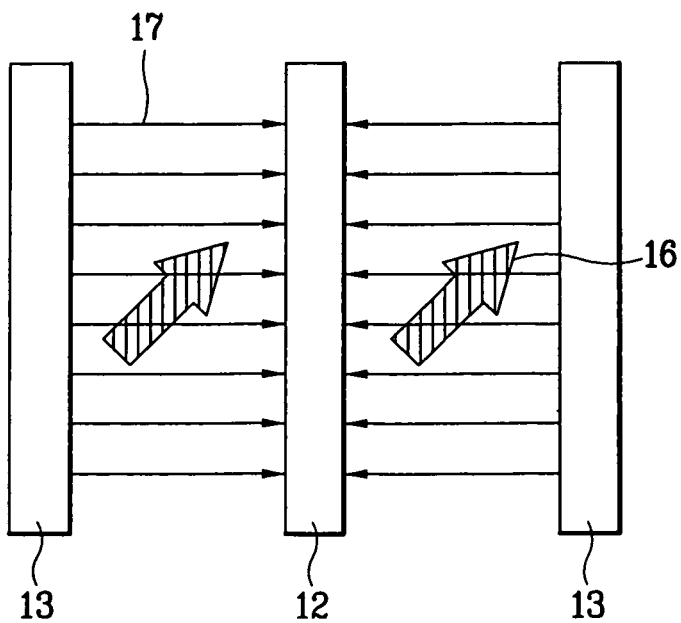
Figure 5:
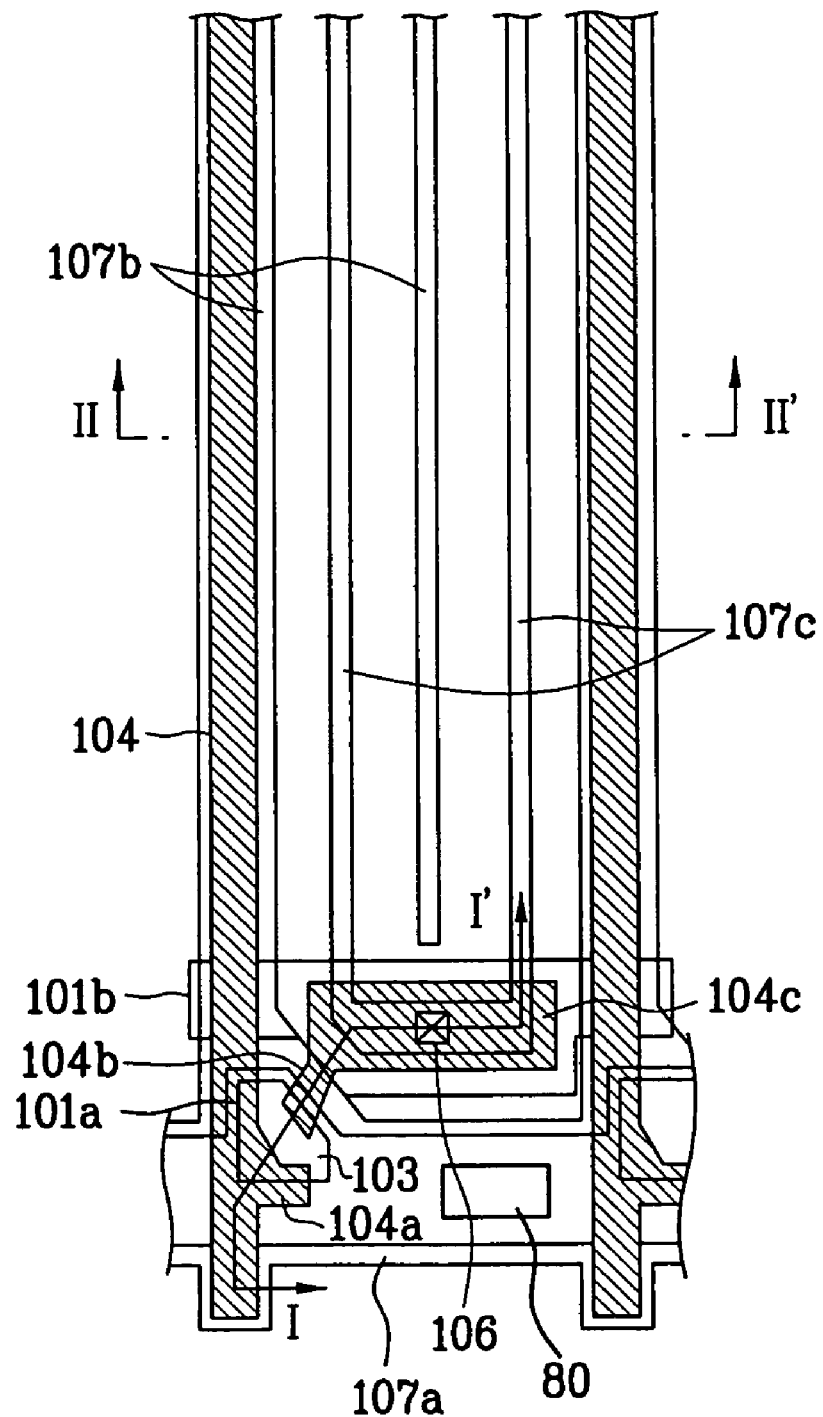
FIG. 5 is a plan view illustrating an IPS mode LCD device according to the related art.
Figure 6:
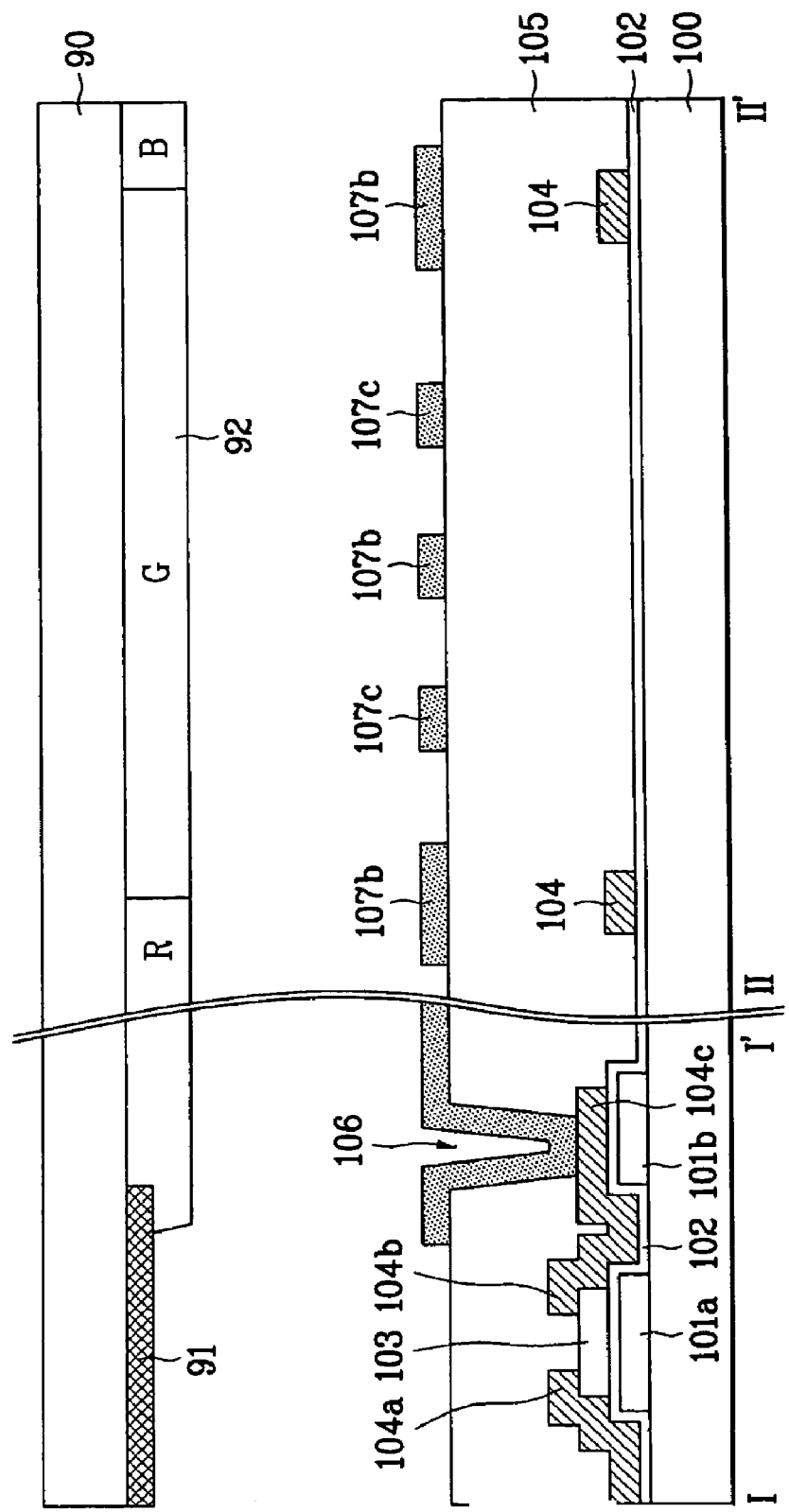
FIG. 6 is a cross-sectional view taken along lines I-I' and II-II' of FIG. 5.
Figure 7:
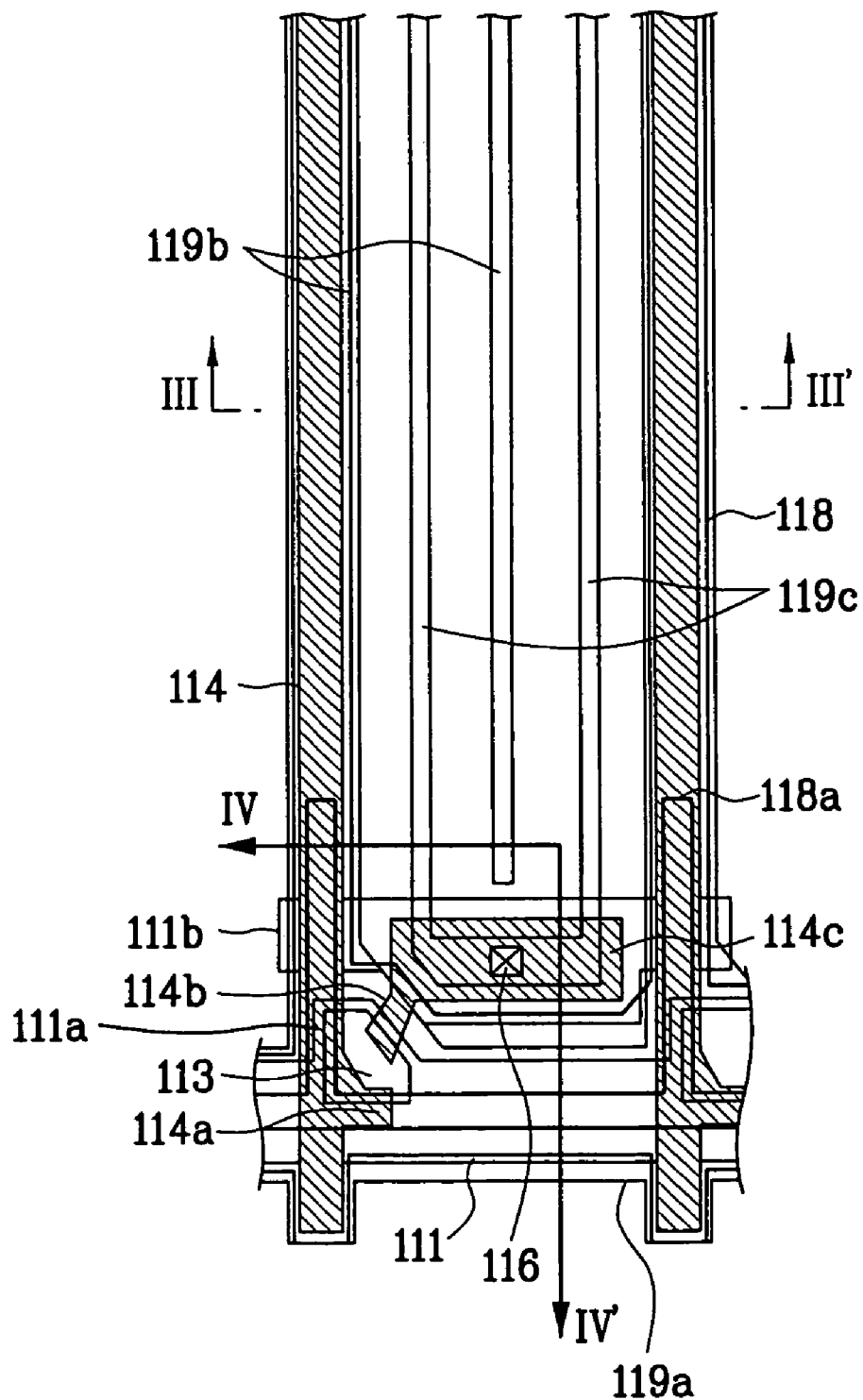
FIG. 7 is a plan view illustrating an LCD device according to the first embodiment of the present invention.
Figure 8:
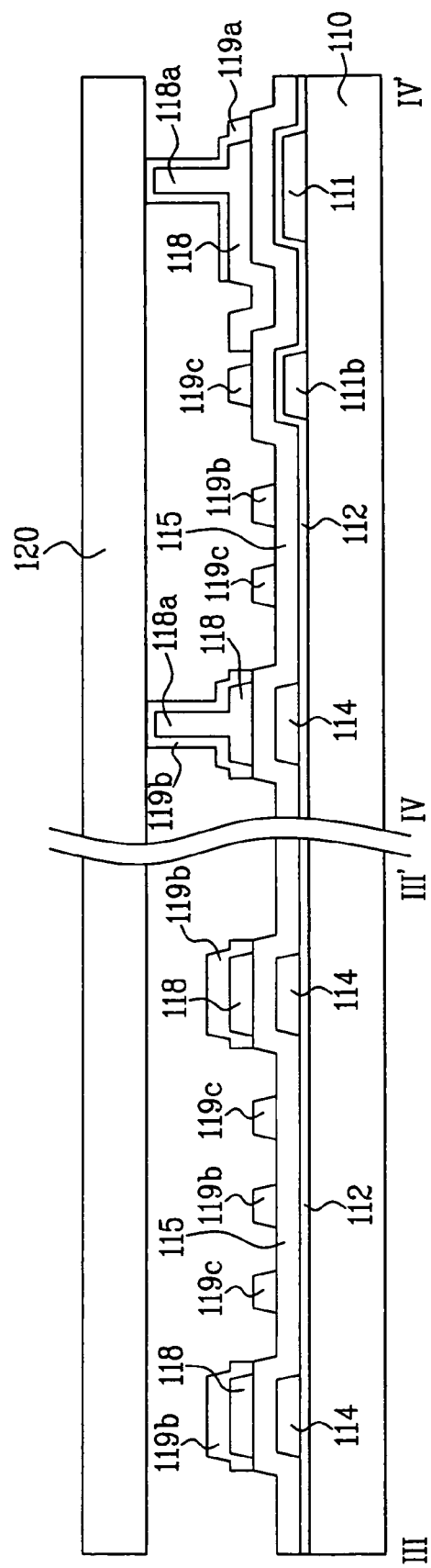
FIG. 8 is a cross-sectional view taken along lines III-III' and IV-IV' of FIG. 7.

An LCD device according to the first embodiment of the present invention will be described as follows. FIG. 7 is a plane view illustrating an IPS mode LCD device according to the first embodiment of the present invention. FIG. 8 is a cross-sectional view taken along lines II-III' and IV-IV' of FIG. 7.

In the IPS mode LCD device according to the first embodiment of the present invention, as shown in FIG. 7 and FIG. 8, a transparent lower substrate 110 includes a gate line 111, a gate electrode 111a, a first common line 111b, a gate insulating layer 112, an active layer 113, a data line 114, a source electrode 114a, a drain electrode 114b, a storage electrode 114c, a first insulating interlayer 115, an insulating layer 118, a second common line 119a, a common electrode 119b, and a pixel electrode 119c.

The gate line 111 is formed on the transparent lower substrate 110 in one direction, and the gate electrode 111a protrudes from one portion of the gate line 111. Also, the first common line 111b may be formed of the same material and on the same layer as the gate line 111 and substantially in parallel. The gate insulating layer 112 of SiNx or SiOx may be formed on an entire surface of the lower substrate 110 including the gate electrode 111a and the first common line 111b, and the island-shaped active layer 113 is formed on the gate insulating layer 112 above the gate electrode 111a. Also, the data line 114 is formed substantially perpendicular to the gate line 111, to define a pixel region. Then, the source electrode 114a protruding from the data line 114 overlaps with one side of the active layer 113, and the drain electrode 114b overlaps with the other side of the active layer 113 at a predetermined distance from the source electrode 114a. The storage electrode 114c extends from the drain electrode 114b. The first insulating interlayer 115 may be formed on the entire surface of the lower substrate 110 including the data line 114, wherein the first insulating interlayer 115 has a first contact hole 116 corresponding to one portion of the storage electrode 114c extending from the drain electrode 114b. After that, the insulating layer 118 has a wall 118a on the first insulating interlayer 115 above the gate line 111, the data line 114 and a thin film transistor TFT. The second common line 119a is formed on the insulating layer 118 having the wall 118a, corresponding to the first insulating interlayer 115 above the gate line 111 and the thin film transistor TFT. Also, the common electrode 119b is formed as one with the second common line 119a, and formed on the insulating layer 118 having the wall 118a above the data line 114 and in one portion of the pixel region as one direction. The pixel electrode 119c is in contact with the drain electrode 114a and the storage electrode 114c through the first contact hole 116, and formed between the common electrodes 119b at fixed intervals.

Although not shown, an alignment layer (not shown) of polyimide is formed on the entire surface of the lower substrate 110. Also, the first insulating interlayer 115 is formed of silicon nitride SiNx. As described above, the storage electrode 114c extends from the drain electrode 114b on the gate insulating layer 112 above the first common line 11b, thereby forming an SOC (Storage On Common) structure. Also, the second common line 119a, the common electrode 119b and the pixel electrode 119c are formed on the same layer, of ITO (Indium-Tin-Oxide), TO (Tin-Oxide), IZO (Indium-Zinc-Oxide) or ITZO (Indium-Tin-Zinc-Oxide). Further, the common electrode 119b is wider than the data line 114 to be completely overlapped with the data line 114, whereby the common electrode 119b and the adjacent pixel electrode 119c are driven together by an electric field parallel to the substrate. The common electrode 119b of the pixel region is substantially parallel to the data line 114.

When the second common line 119a the common electrode 119b completely overlap with the gate line 11 and the data line 114, it is possible not to apply signals of the gate and data lines to the liquid crystal, thereby preventing light leakage generated by alignment distortion of liquid crystal. Also, the insulating layer 118 having the wall 118a is formed above the thin film transistor and the predetermined portions of the adjacent gate and data lines 111 and 114. At this time, the insulating layer 118 is formed at a predetermined thickness above the gate line 111, the data line 114 and the thin film transistor, and the wall 118a is thicker than the insulating layer 118. In case of the wall 118a surrounding a lower side of the pixel region above the gate line 111 and the data line 114, the wall 118a is thicker than the insulating layer 118 formed in the other regions.

The insulating layer 118 having the wall 118a is formed of photo-polymer. In this case, since the insulating layer 118 is formed of photo-polymer, it is possible to prevent signal distortion between the common electrode 119b and the data line 114, even though the transparent common electrode 119b is formed on the insulating layer 118 above the data line 114. By interposing the insulating layer 118 having a low dielectric constant, the common electrode 119b is overlapped with the data line 114, thereby improving aperture ratio. To prevent the problem of signal delay of the gate and data lines 111 and 114 by the second common line 119a and the common electrode 119b, the insulating layer 118 is formed of an organic insulating layer having a low dielectric constant, for example, at least any one of photo acryl, polyimide, and BCB (Benzo-CycloButene). In a large-sized panel, the wall 118a prevents the liquid crystal from flowing down by the force of gravity. For example, when the large-sized panel is slanted in the left and right directions, the wall 118a corresponding to the data line 114 prevents the liquid crystal from flowing in the left and right directions, and the wall 118a corresponding to the gate line 111 prevents the liquid crystal from flowing on the lower and upper directions. In this case, the wall 118a is formed at a height corresponding to a cell gap, whereby it is not required to carry out the additional process for distribution of ball spacers, or formation of column spacers by exposure. For reference, although not shown, the insulating layer 118 having the wall 118a may be formed as one pixel unit, or several tens to hundreds of pixel units.

Figure 9A:
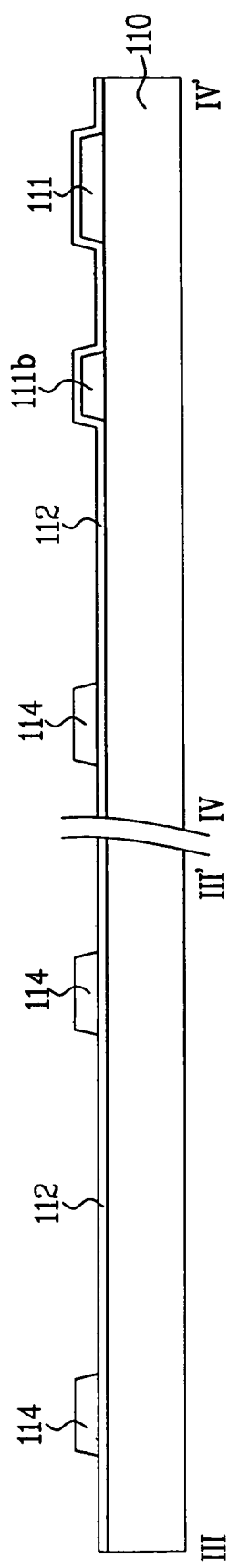

A method for fabricating the LCD device according to the first embodiment of the present invention will be described as follows. FIG. 9A to FIG. 9C are cross-sectional views illustrating the fabrication process of the LCD device according to the first embodiment of the present invention.

As shown in FIG. 9A, a conductive metal layer is formed on the transparent lower substrate 110, and patterned by photolithography, thereby forming a gate pad (not shown) including one broad end of a predetermined area, the gate line 111 extending from the gate pad in one direction, and the gate electrode 111a protruding from the gate line 111 in one direction. Also, the first common line 111b is formed of the same material and on the same layer as the gate line 111 substantially in parallel. Next, the gate insulating layer 112 may be formed on the entire surface of the lower substrate 110 including the gate line 111 and the first common line 111b. The gate insulating layer 112 may be formed of silicon nitride SiNx or silicon oxide SiO2.

Thereafter, a semiconductor layer (an amorphous silicon layer and another amorphous silicon layer doped with impurity) is formed on the gate insulating layer 112. Subsequently, the semiconductor layer is patterned by photolithography, whereby the island-shaped active layer ('113' of FIG. 7) is formed above the gate electrode 111a. After that, a conductive metal layer is formed on the entire surface of the lower substrate 110 including the active layer 113, and patterned by photolithography, thereby forming the data line 114 substantially perpendicular to the gate line 111 to define the pixel region, a source pad (not shown) at one end having a predetermined area, the source electrode 114a protruding from the data line 114 in one direction, and the drain electrode 114b at a predetermined distance from the source electrode 114a. The storage electrode 114c extending from the drain electrode 114b is formed above the first common line 111b, whereby a storage capacitor is formed as the SOC (Storage On Common) structure. In the aforementioned process, the thin film transistor TFT is formed at a crossing point of the gate and data lines 111 and 114.

As shown in FIG. 9B, the first insulating interlayer 115 may be formed on the entire surface of the lower substrate 110 including the data line 114, and the first contact hole 116 is formed to expose one portion of the storage electrode 114c extending from the drain electrode 114b. The first insulating interlayer 115 may be formed of silicon nitride SiNx. Then, an insulating material is deposited on the first insulating interlayer 115 including the data line 114, and etched with a diffraction exposure mask 117 having a slit, thereby forming the insulating layer 118 having the wall 118a. At this time, the insulating layer 118 overlaps with the data line 114, the gate line 111, the thin film transistor, and one portion of the first common line 111b. Also, the wall 118a surrounds the lower side of the pixel region, whereby the wall 118a is thicker than the insulating layer 118 formed above the gate line 111 and the both data lines 114 adjacent thereto. The wall 118a has the height corresponding to the cell gap, whereby the wall 118a may serve as the spacer when bonding the two substrates.

When forming the insulating layer 118 using a negative type insulating layer, the diffraction exposure mask 117 has a closed part corresponding to the wall 118a, and a slit pattern corresponding to the insulating layer 118, and a transmission part corresponding to the remaining portions. Meanwhile, when forming the insulating layer 118 using a positive type insulating layer, the diffraction exposure mask 117 has a transmission part corresponding to the wall 118a, a slit pattern corresponding to the insulating layer 118, and a closed part corresponding to the remaining portions. Preferably, the insulating layer 118 having the wall 118a is formed of photopolymer. However, the insulating layer 118 may be formed of an organic insulating layer having a low dielectric constant, for example, any one of photo acryl, polyimide, and BCB (BenzoCycloButene). In addition to a method using the diffraction exposure mask, the insulating layer 118 having the wall 118a may be formed by a printing method or a method using a soft mold without the exposure process.

As shown in FIG. 9C, a transparent conductive layer is formed on an insulating layer 118 having a wall 118a, and selectively removed by photolithography, thereby forming the second common line 119a, the common electrode 119b and the pixel electrode 119c. The second common line 119a are formed above the gate line 111 and the thin film transistor TFT to be overlapped therewith. Also, the common electrode 119b is connected with the second common line 119a, and the common electrode 119b is wider than the data line 114 to completely cover the data line 114. The common electrode 119b extending from the second common line 119a is formed in the pixel region in one direction. The second common electrode 119b is substantially parallel to the data line 114 in the pixel region. Then, the pixel electrode 119c is connected with the drain electrode 114b and the storage electrode 114c through the first contact hole 116, and formed between the common electrodes 119b at fixed intervals.

The transparent conductive layer may be formed of ITO (Indium-Tin-Oxide), TO (Tin-Oxide), IZO (Indium-Zinc-Oxide) or ITZO (Indium-Tin-Zinc-Oxide). Although not shown, the alignment layer may be formed of polyimide or photosensitive material. If the alignment layer is formed of polyimide, the alignment direction is determined by mechanical rubbing. In the meantime, if the alignment layer is formed of the photosensitive material such as polyvinylcinnamate(PVCN)-based material or polysiloxane-based material, the alignment direction is determined by the irradiation of ultraviolet rays. The alignment direction depends on the light irradiation direction or light characteristics such as polarizing direction.

After that, the upper substrate 120 is prepared, and a sealant (not shown) is formed on the lower substrate 110 or the upper substrate 120. Then, the lower and upper substrates 110 and 120 are bonded to each other by the sealant. Although not shown, another alignment layer is formed on an entire surface of the upper substrate 120. In this case, the alignment layer of the upper substrate 120 is formed of the same material as that of the alignment on the lower substrate 110.

Second Embodiment

Figure 10:
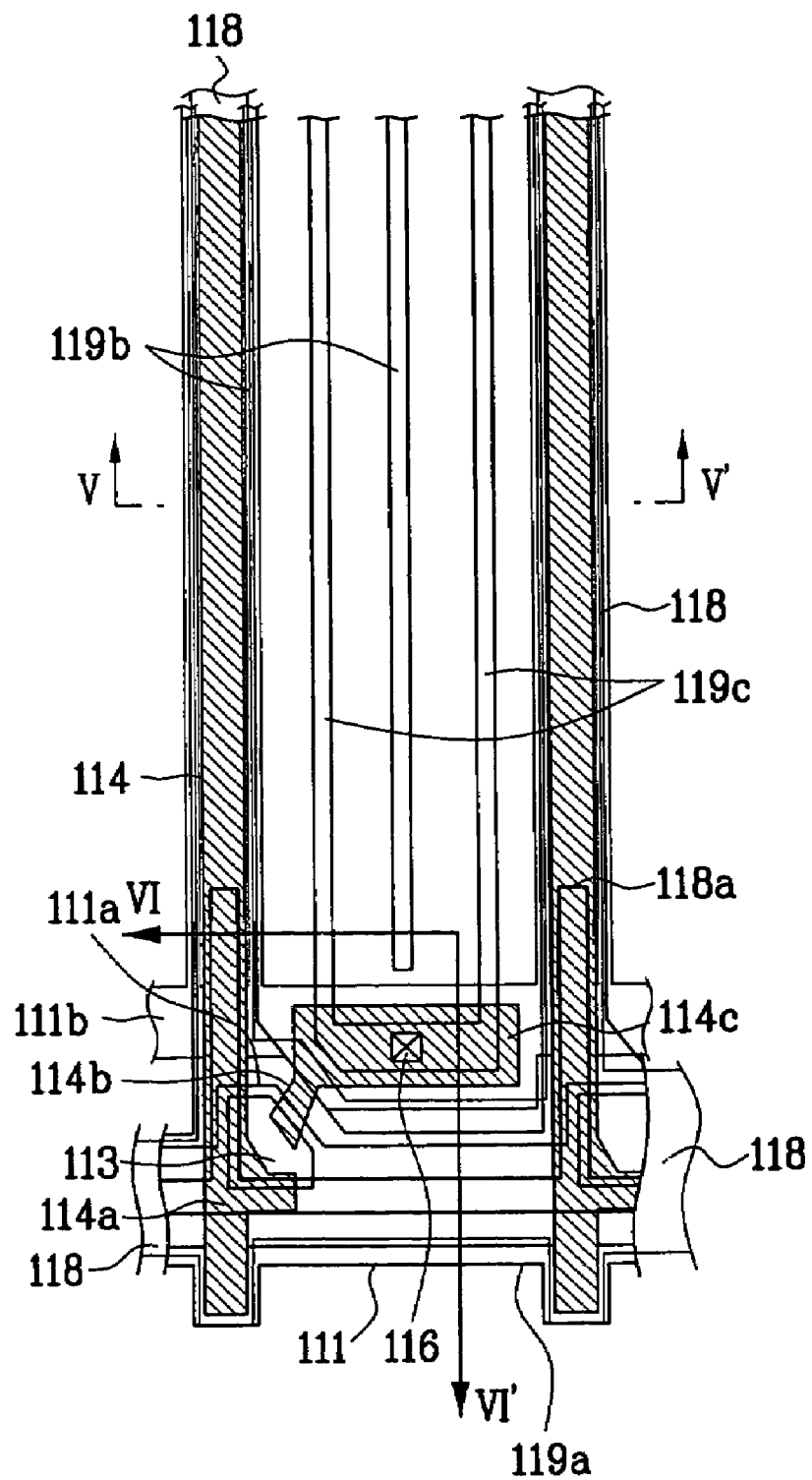
FIG. 10 is a plan view illustrating an LCD device according to the second embodiment of the present invention.
Figure 11:
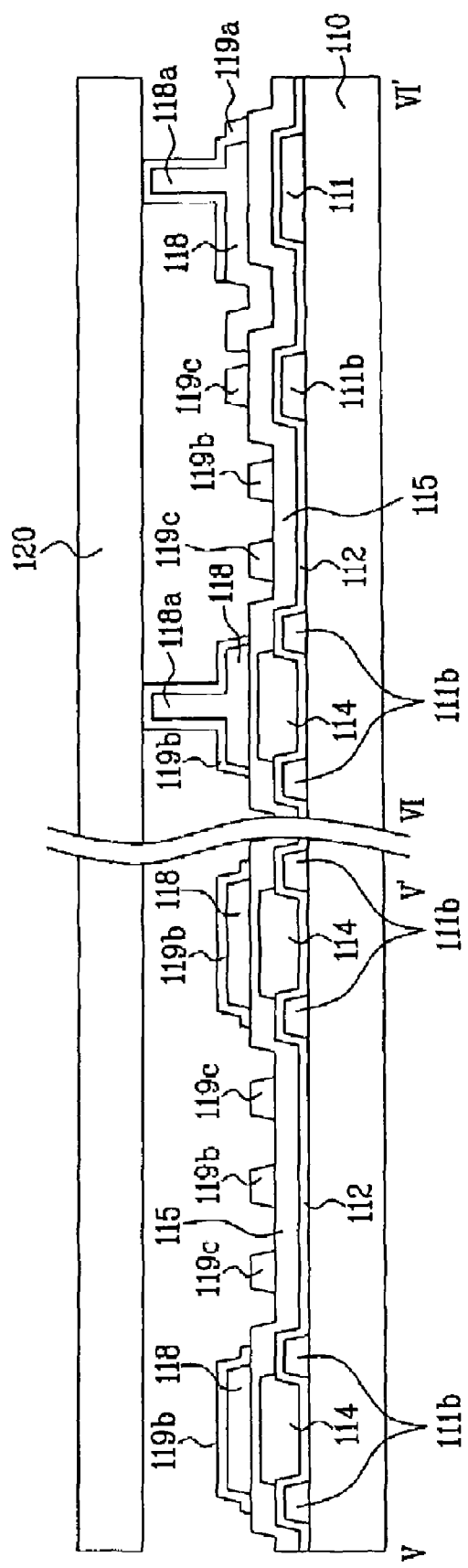
FIG. 11 is a cross-sectional view taken along lines V-V' and VI-VI' of FIG. 10.
Figure 12A:
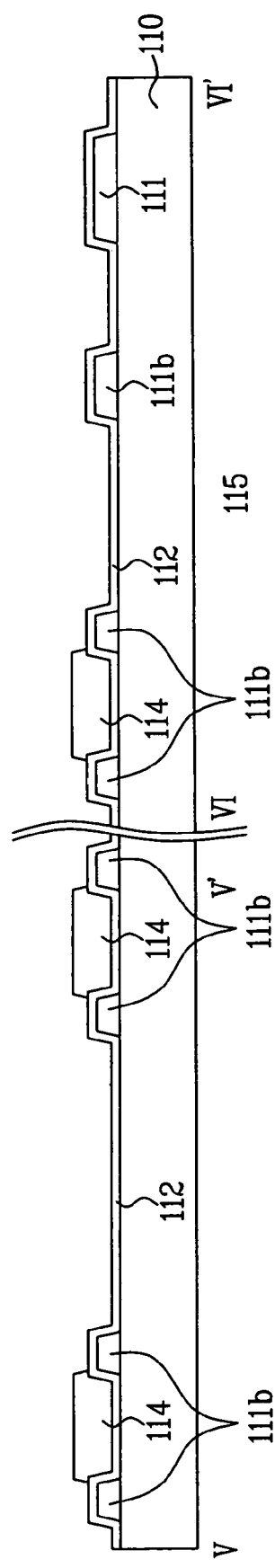
Figure 12C:
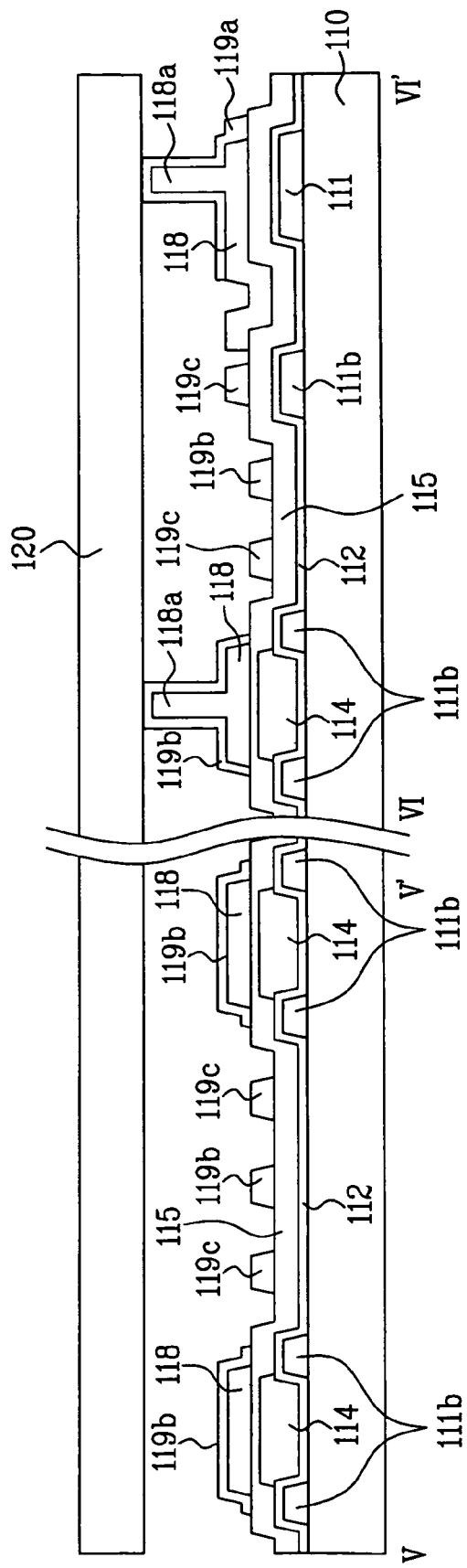

An LCD device according to the second embodiment of the present invention and a method for fabricating the same will be described as follows. FIG. 10 is a plan view illustrating an LCD device according to the second embodiment of the present invention. FIG. 11 is a cross-sectional view taken along lines V-V' and VI-VI' of FIG. 10. FIG. 12A to FIG. 12C are cross-sectional views illustrating the fabrication process of an LCD device according to the second embodiment of the present invention.

As shown in FIG. 10 and FIG. 11, the LCD device according to the second embodiment of the present invention has the same structure as that of the LCD device according to the first embodiment of the present invention except that a first common line 111b is formed substantially parallel to a gate line 111, and extends substantially perpendicular to overlap both lower sides of a data line 114 forming the step coverage of a common electrode 119b, whereby the explanation for the structure of the LCD device of the second embodiment common to that of first embodiment of the present invention will be omitted.

In the LCD device according to the second embodiment of the present invention, the first common line 111b extends along the both lower sides of the data line 114 forming the step coverage of the common electrode 119b, to prevent alignment distortion of liquid crystal molecules at both ends of the common electrode 119b above the data line 114, and light leakage at the portion corresponding to the alignment distortion of liquid crystal molecules.

A method for fabricating the LCD device according to the second embodiment of the present invention will be described as follows. FIG. 12A to FIG. 12C are cross-sectional views illustrating the fabrication process of the LCD device according to the second embodiment of the present invention.

As shown in FIG. 12A and FIG. 12C, when forming the first common line 111b of the same material and on the same layer as the gate line 111, the first common line 111b formed substantially parallel to the gate line 111, also extends substantially perpendicular to the gate line 111. Except for this, the LCD device according to the second embodiment of the present invention is formed using the same fabrication process as that of the LCD device according to the first embodiment of the present invention.

In the aforementioned fabrication process of the LCD device according to the second embodiment of the present invention, the first common line 111b substantially perpendicular to the gate line 111 is formed along the both lower sides of the data line 114. More specifically, when the common electrode 119b is formed above the data line 114 to overlap therewith, the step coverage is formed at the both sides of the common electrode 119b, wherein the first common line 111b is formed along the step coverage of the common electrode 119b.

The LCD device according to the second embodiment of the present invention is formed in the same fabrication process as that of the LCD device according to the first embodiment of the present invention except the process of forming the first common line 111b, whereby the fabrication process of the LCD device according to the second embodiment of the present invention will be omitted.

Third Embodiment

Figure 13:
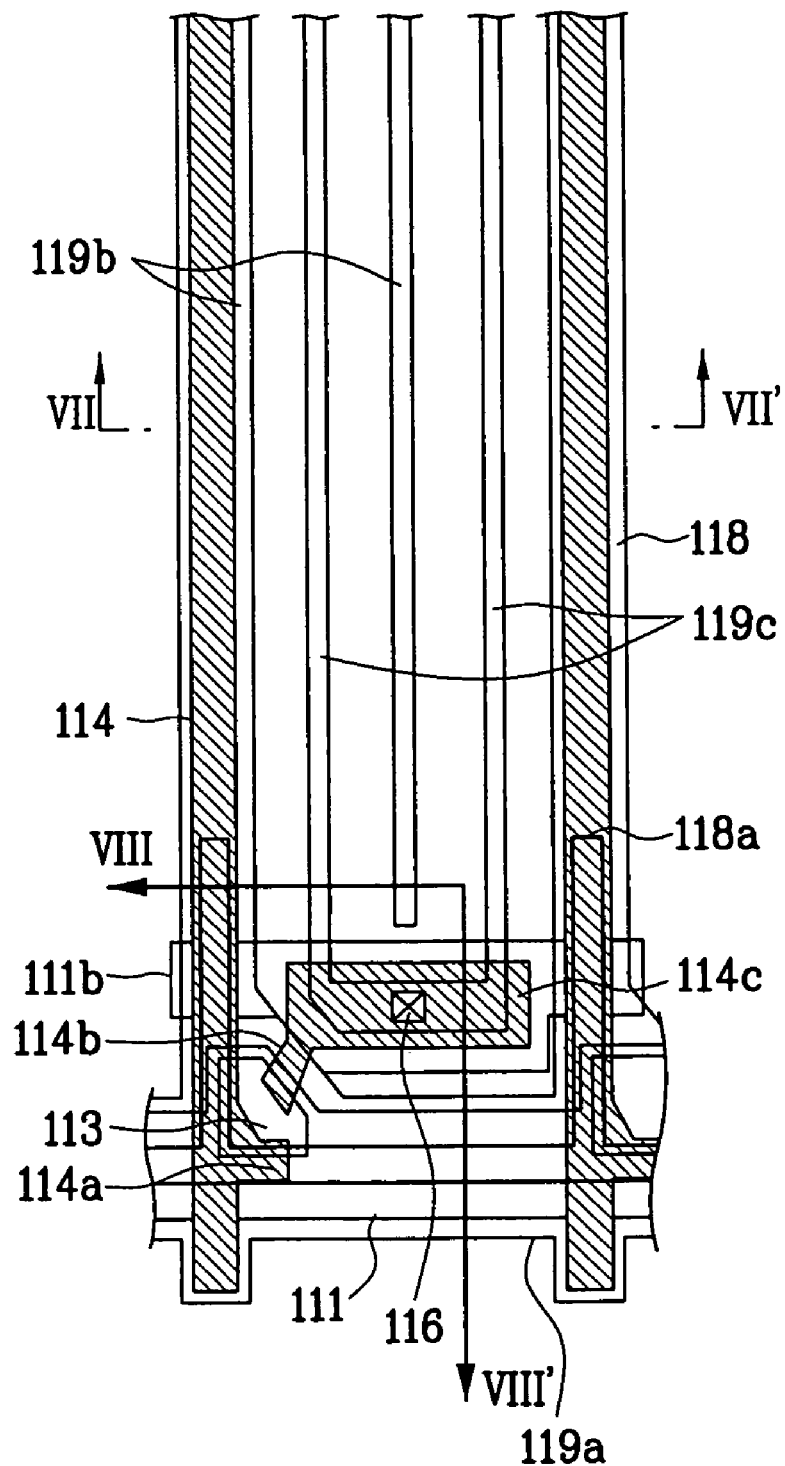
FIG. 13 is a plan view illustrating an LCD device according to the third embodiment of the present invention.
Figure 14:
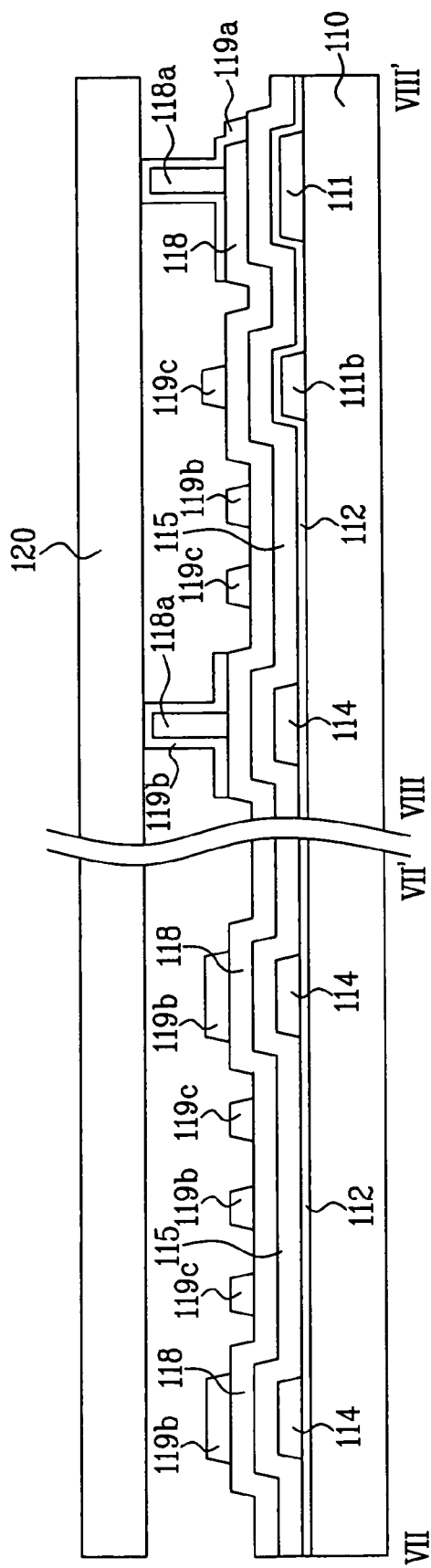
FIG. 14 is a cross-sectional view taken along lines VII-VII' and VIII-VIII' of FIG. 13.

An LCD device according to the third embodiment of the present invention will be described as follows. FIG. 13 is a plan view illustrating an LCD device according to the third embodiment of the present invention. FIG. 14 is a cross-sectional view taken along lines VII-VII' and VIII-VIII' of FIG. 13.

As shown in FIG. 13 and FIG. 14, the LCD device according to the third embodiment of the present invention has the same structure as that of the LCD device according to the first embodiment of the present invention except that the step coverage is not formed at both sides of a common electrode 119b above a data line 114 by forming an insulating layer 118 on an entire surface of a first insulating interlayer 115, and a first contact hole exposing one portion of a storage electrode 114c extending from a drain electrode 114b is formed in the first insulating interlayer 115 and the insulating layer 118, whereby the explanation for the LCD device of the third embodiment common to that of the first embodiment of the present invention will be omitted.

In the LCD device according to the third embodiment of the present invention, the step coverage is not formed at the both sides of the common electrode 119b above the data line 114, so that it is possible to prevent alignment distortion of liquid crystal molecules at both ends of the common electrode 119b above the data line 114, and light leakage at the portion corresponding to the alignment distortion of liquid crystal molecules.

Figure 15A:
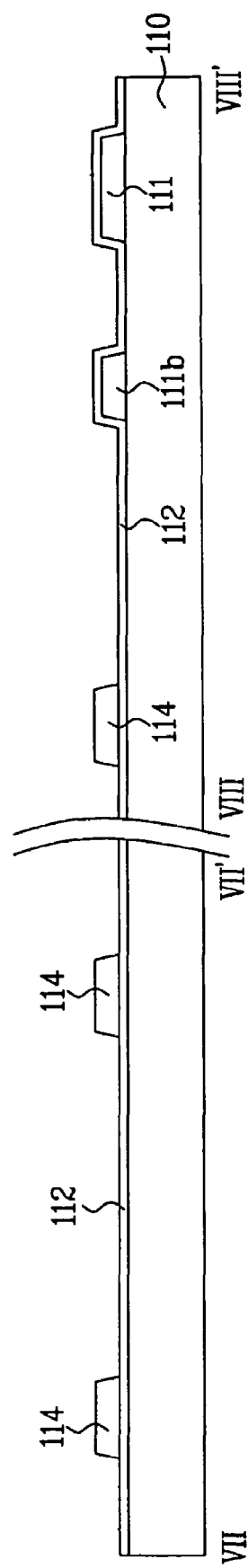
FIG. 15A to FIG. 15C are cross-sectional views illustrating the fabrication process of an LCD device according to the third embodiment of the present invention.
Figure 15B:
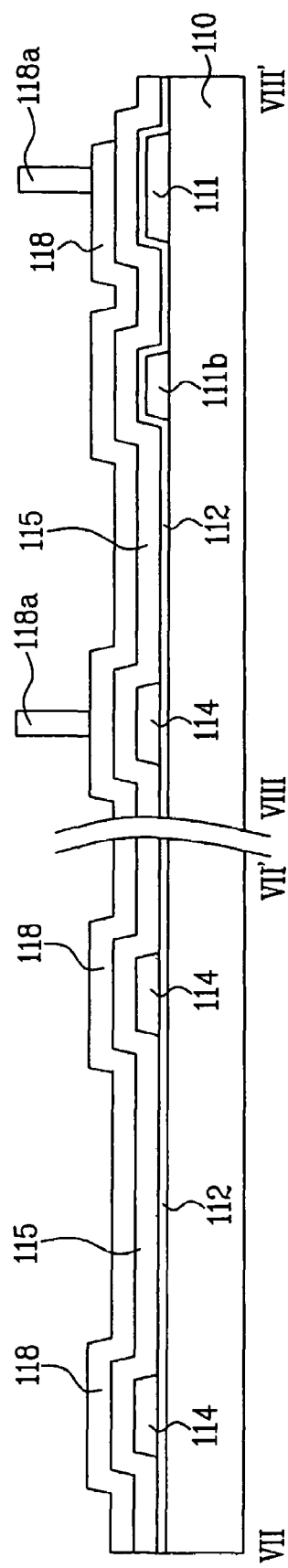
Figure 15C:
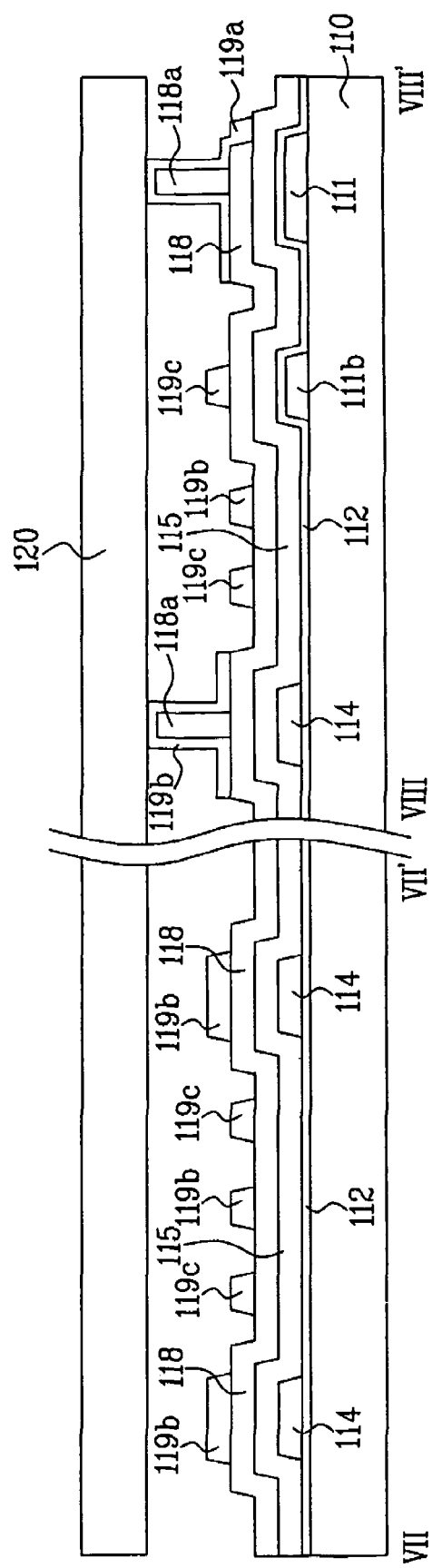

A method for fabricating the LCD device according to the third embodiment of the present invention will be described with reference to the accompanying drawings. FIG. 15A to FIG. 15C are cross-sectional views illustrating the fabrication process of an LCD device according to the third embodiment of the present invention.

As shown in FIG. 15A, a conductive metal layer is formed on a transparent lower substrate at 110, and patterned by photolithography, thereby forming a gate pad (not shown) having a predetermined area at one end, a gate line 111 extending from the gate pad in one direction, and a gate electrode 111a protruding from the gate line 111 in one direction. Also, a first common line 11b is formed of the same material and on the same layer as the gate line 111 substantially in parallel. After that, a gate insulating layer 112 is formed on the entire surface of the lower substrate 110 including the gate line 111 and the first common line 111b. The gate insulating layer 112 may be formed of silicon nitride SiNx or silicon oxide SiO2.

After that, a semiconductor layer (an amorphous silicon layer and another amorphous silicon layer doped with impurity) is formed on the gate insulating layer 112. Subsequently, the semiconductor layer is patterned by photolithography, whereby an island-shaped active layer ('113' of FIG. 13) is formed above the gate electrode 111a. Then, a conductive metal layer is formed on the entire surface of the lower substrate 110 including the active layer 113, and patterned by photolithography, thereby forming the data line 114 substantially perpendicular to the gate line 111 to define the pixel region, a source pad (not shown) having one end of a predetermined area, a source electrode 114a protruding from the data line 114 in one direction, and the drain electrode 114b at a predetermined interval from the source electrode 114a. At this time, a storage electrode 114c extending from the drain electrode 114b is formed above the first common line 111b, whereby a storage capacitor is formed as an SOC (Storage On Common) structure. In the aforementioned process, a thin film transistor TFT is formed at a crossing point of the gate and data lines 111 and 114.

Subsequently, as shown in FIG. 15B, the first insulating interlayer 115 may be formed on the entire surface of the lower substrate 110 including the data line 114. The first insulating interlayer 115 may be formed of silicon nitride SiNx. Thereafter, the insulating layer 118 is formed on the entire surface of the first insulating layer 115 including the data line 114 by a first printing method, and then a wall 118a is formed by a second printing method. At this time, the insulating layer 118 is formed on the entire surface of the first insulating layer 115, whereby it is possible to prevent generation of the step coverage at the both sides of the common electrode 119b when the common electrode 119b is overlapped with the insulating layer 118 above the data line 114. Also, the wall 118a is formed above the gate line 111 and the both data lines 114 adjacent thereto, to surround the lower side of the pixel region. In this state, the wall 118a has a height corresponding to a cell gap, whereby the wall 118a serves as a spacer when bonding the two substrates.

Preferably, the insulating layer 118 and the wall 118a are formed of photo-polymer. However, it is possible to form the insulating layer 118 and the wall 118a of an organic insulating layer having a low dielectric constant, for example, at least any one of photo acryl, polyimide, and BCB (BenzoCycloButene). Instead of the printing method, the insulating layer 118 and the wall 118a may be formed in a method of carrying out the deposition and exposure process once. Then, the first insulating layer 115 and the insulating layer 118 are etched selectively, thereby forming the first contact hole 116 exposing one portion of the storage electrode 114c extending from the drain electrode 114b.

Referring to FIG. 15C, a transparent conductive layer is formed on the insulating layer 118 including the wall 118a, and selectively removed by photolithography, thereby forming a second common line 119a, the common electrode 119b and a pixel electrode 119c. At this time, the second common line 119a is formed above the gate line 111 and the thin film transistor to overlap therewith. Also, the common electrode 119b is connected to the second common line 119a, and the common electrode 119b is wider than the data line 114 to completely cover the data line 114. The common electrode 119b extending from the second common line 119a is formed in the pixel region in one direction. The second common electrode 119b is substantially parallel to the data line 114 in the pixel region. In this state, the common electrode 119b has no step coverage at the both sides thereof. Then, the pixel electrode 119c is connected with the drain electrode 114b and the storage electrode 114c through the first contact hole 116, and formed between the common electrodes 119b.

The transparent conductive layer may be formed of ITO (Indium-Tin-Oxide), TO (Tin-Oxide), IZO (Indium-Zinc-Oxide) or ITZO (Indium-Tin-Zinc-Oxide). Although not shown, the alignment layer of polyimide or photosensitive material is formed on the entire surface of the lower substrate 110 including the second common line 119a, the common electrode 119b and the pixel electrode 119c. If the alignment layer is formed of polyimide, the alignment direction is determined by mechanical rubbing. In the meantime, if the alignment layer is formed of a photosensitive material such as a polyvinylcinnamate(PVCN)-based material or a polysiloxane-based material, the alignment direction is determined by irradiation of ultraviolet rays. At this time, the alignment direction depends on the light irradiation direction or the light characteristics such as polarizing direction.

After that, the upper substrate 120 is prepared, and a sealant (not shown) is formed on the lower substrate 110 or the upper substrate 120. Then, the lower and upper substrates 110 and 120 are bonded to each other by the sealant. Although not shown, another alignment layer is formed on an entire surface of the upper substrate 120. The alignment layer of the upper substrate 120 may be formed of the same material as that of the alignment layer on the lower substrate 110.

Fourth Embodiment

Figure 16:
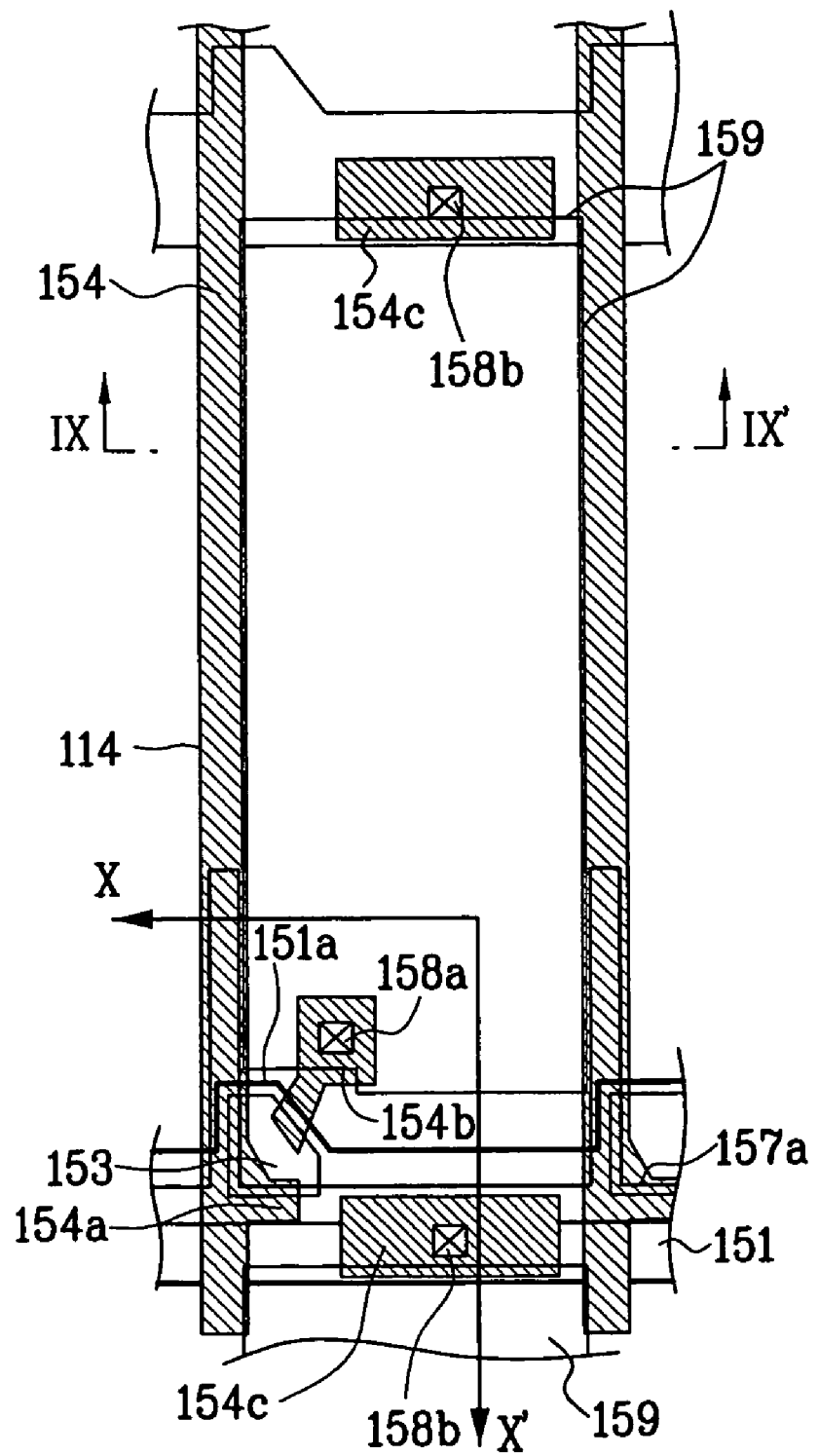
FIG. 16 is a plan view illustrating an LCD device according to the fourth embodiment of the present invention.
Figure 17:
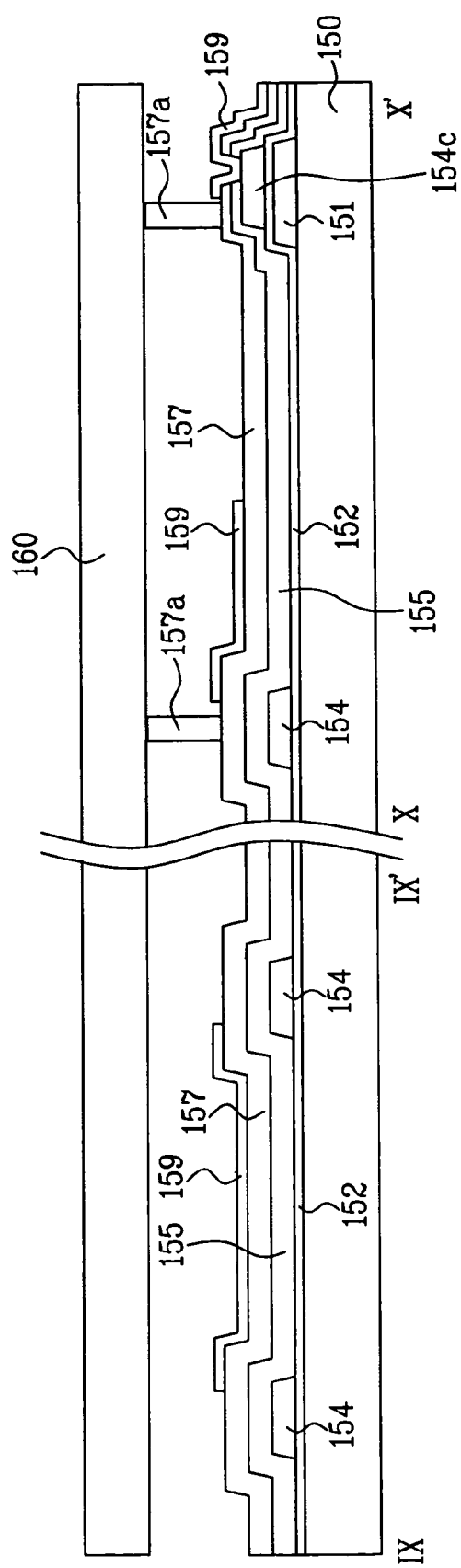
FIG. 17 is a cross-sectional view taken along lines IX-IX' and X-X' of FIG. 16.

An LCD device according to the fourth embodiment of the present invention will be described as follows. FIG. 16 is a plan view illustrating an LCD device according to the fourth embodiment of the present invention. FIG. 17 is a cross-sectional view taken along lines IX-IX' and X-X' of FIG. 16.

In the LCD device according to the fourth embodiment of the present invention, as shown in FIG. 15 and FIG. 16, a lower substrate 150 includes gate and data lines 151 and 154 substantially perpendicular to each other to define a pixel region P, a pixel electrode 159 in the pixel region P defined by crossing the gate and data lines 151 and 154, and a thin film transistor TFT at a crossing point of the gate and data lines 151 and 154.

The thin film transistor TFT includes a gate electrode 151a protruding from the gate line 151, a gate insulating layer 152 on an entire surface of the lower substrate 150, an active layer 153 on the gate insulating layer 152 above the gate electrode 111a, a source electrode 154a protruding from the data line 154 to overlap one side of the active layer 153, and a drain electrode 154b overlapping the other side of the active layer 153 at a predetermined distance from the source electrode 154a.

Also, a storage electrode 154c is formed above the preceding gate line 151. Then, a first insulating interlayer 155 may be formed on the entire surface of the lower substrate 150 including the thin film transistor TFT. The first insulating interlayer 155 may be formed of silicon nitride SiNx. Subsequently, a second insulating interlayer 157 is formed on the entire surface of the first insulating interlayer 155, and walls 157a are formed on one predetermined portion of the gate line formed in the lower side of the pixel region and some portions of the both data lines 154 adjacent thereto. The wall 157a has the same characteristics as that of the wall in the LCD device according to the first embodiment of the present invention. In a large-sized LCD panel, the wall 157a prevents liquid crystal from flowing down by the force of gravity. That is, when the panel is slanted in the left and right directions, the wall 157a corresponding to the data line 154 prevents the liquid crystal from flowing in the left and right directions, and the wall 157a corresponding to the gate line 151 prevents the liquid crystal from flowing in the lower and upper directions. In this case, the wall 157a is formed at a height corresponding to a cell gap.

Thereafter, a first contact hole 158a exposing one portion of the drain electrode 154b is formed in the first insulating interlayer 155 and the second insulating interlayer 157, and a second contact hole 158b exposing one portion of the storage electrode 154c is formed. As a result, the pixel electrode 159 is in contact with the drain electrode 154b through the first contact hole 158a, and in contact with the storage electrode 154c through the second contact hole 158b. At this time, the pixel electrode 159 overlaps the adjacent data line 154, wherein the pixel electrode 159 may be formed of ITO (Indium-Tin-Oxide), TO (Tin-Oxide), IZO (Indium-Zinc-Oxide) or ITZO (Indium-Tin-Zinc-Oxide). As described above, the pixel electrode 159 is in contact with the storage electrode 154c above the preceding gate line 151.

Although not shown, an upper substrate 160 is formed opposite to the lower substrate 150. The upper substrate 160 includes a black matrix layer 161 that blocks light on the portions of the display except the pixel region P, R/G/B color filter layers 162 to display various colors, and a common electrode 163 to produce a picture image.

Figure 18A:
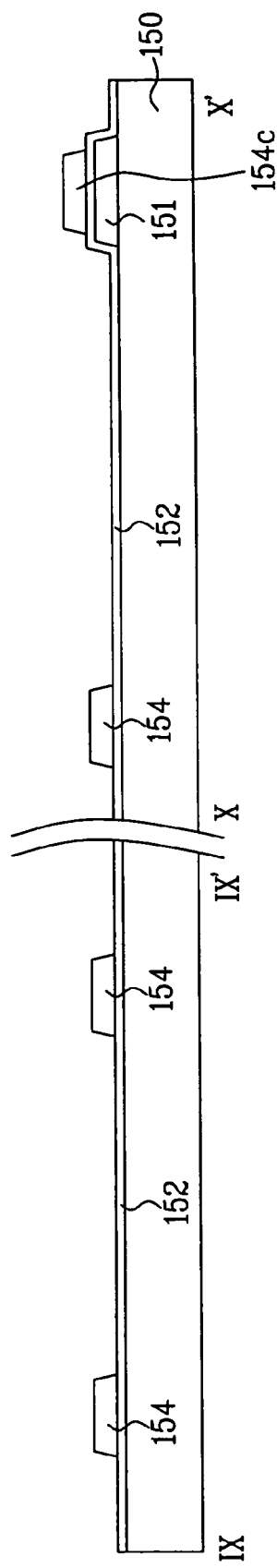
Figure 18B:
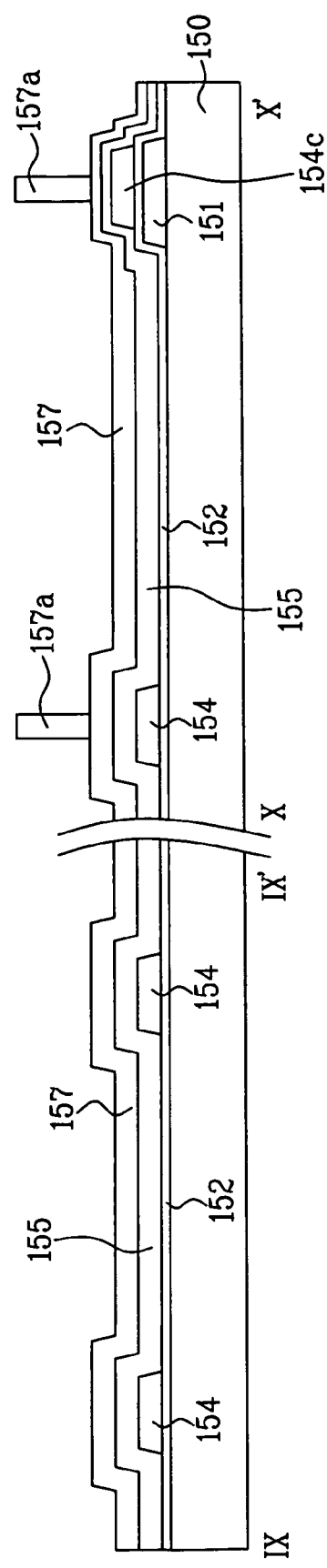

A method of fabricating the LCD device according to the fourth embodiment of the present invention will be described as follows. FIG. 18A to FIG. 18C are cross-sectional views illustrating the fabrication process of an LCD device according to the fourth embodiment of the present invention.

As shown in FIG. 18A, a conductive metal layer is formed on the transparent lower substrate 150, and then patterned by photolithography, thereby forming a gate pad (not shown) including a predetermined area at one end, the gate line 151 extending from the gate pad (not shown) in one direction, and the gate electrode 151a protruding from the gate line 151 in one direction. The gate insulating layer 152 is formed on the entire surface of the lower substrate 150 including the gate line 151. The gate insulating layer 152 may be formed of silicon nitride SiNx or silicon oxide SiO2.

Thereafter, a semiconductor layer (an amorphous silicon layer and another amorphous silicon layer doped with impurity) is formed on the gate insulating layer 152. Subsequently, the semiconductor layer is patterned by photolithography, whereby the island-shaped active layer ('153' of FIG. 16) is formed above the gate electrode 151a. Next, a conductive metal layer is formed on the entire surface of the lower substrate 150 including the active layer 153, and then patterned by photolithography, thereby forming the data line 154 substantially perpendicular to the gate line 151 to define the pixel region, a source pad (not shown) having a predetermined area at one end, the source electrode 154a protruding from the data line 154 in one direction, and the drain electrode 154b at a predetermined distance from the source electrode 154a. The storage electrode 154c is formed above the preceding gate line, whereby a storage capacitor is formed as the SOC (Storage On Common) structure. In the aforementioned process, the thin film transistor TFT is formed at a crossing point of the gate and data lines 151 and 154.

Subsequently, as shown in FIG. 18B, the first insulating interlayer 155 is formed on the entire surface of the lower substrate 150 including the data line 154. The first insulating interlayer 155 is formed of silicon nitride SiNx. Then, the second insulating interlayer 157 is formed on the entire surface of the first insulating interlayer 155 including the data line 154 by a first printing method, and the wall 157a is formed by a second printing method. The walls 157a are formed above the gate line 151 and the adjacent data line 154, to surround the lower side of the pixel region. The wall 157a has a height corresponding to the cell gap, whereby the wall 157a serves as the spacer when bonding the two substrates. In this case, the wall 157a is formed at the height corresponding to the cell gap, whereby it is not required to carry out the additional process for distribution of ball spacers, or formation of column spacers by exposure.

Preferably, the wall 157a and the second insulating interlayer 157 are formed of photo-polymer. However, it is possible to form the second insulating interlayer 157 and the wall 157a of an organic insulating layer having a low dielectric constant, for example, any one of photo acryl, polyimide, and BCB (BenzoCycloButene). Instead of the printing method, the second insulating interlayer 157 and the wall 157a may be formed using a method of carrying out the deposition and exposure process once. Then, the first insulating interlayer 155 and the second insulating interlayer 157 are etched to expose the drain electrode 154b and one portion of the storage electrode 154c, thereby forming the first contact hole 158a and the second contact hole 158b.

Next, as shown in FIG. 18C, a transparent conductive layer is formed on the second insulating interlayer 157 including the wall 157a, and selectively removed by photolithography, thereby forming the pixel electrode 159 in the pixel region. The pixel electrode 159 is connected with the drain electrode 154b through the first contact hole 158a, and connected with the storage electrode 154c through the second contact hole 158b.

The transparent conductive layer may be formed of ITO (Indium-Tin-Oxide), TO (Tin-Oxide), IZO (Indium-Zinc-Oxide) or ITZO (Indium-Tin-Zinc-Oxide). Although not shown, the alignment layer of polyimide or photosensitive material may be formed on the entire surface of the lower substrate 150 including the pixel electrode 159. If the alignment layer is formed of polyimide, the alignment direction is determined by mechanical rubbing. In the meantime, if the alignment layer is formed of the photosensitive material such as polyvinylcinnamate(PVCN)-based material or polysiloxane-based material, the alignment direction is determined by irradiation of ultraviolet rays. The alignment, direction depends on the light irradiation direction or the light characteristics such as polarizing direction.

The upper substrate 160 may be prepared, and a sealant (not shown) is formed on the lower substrate 150 or the upper substrate 160. Then, the lower and upper substrates 150 and 160 are bonded to each other by the sealant. Although not shown, another alignment layer is formed on an entire surface of the upper substrate 160. In this case, the alignment layer of the upper substrate 160 may be formed of the same material as that of the alignment layer on the lower substrate 150.

As mentioned above, the LCD device according to the preferred embodiments of the present invention and the method for fabricating the same have the following advantages.

First, the walls are formed above the gate line and the data line, to surround the lower side of the pixel region. Accordingly, when the LCD panel is slanted to the left and right directions, the wall prevents the liquid crystal from flowing to the all directions of the upper/lower/left/right sides. That is, in case of the large-sized LCD panel, it is possible to prevent the liquid crystal from flowing down by the force of gravity.

Second, the insulating layer of the low dielectric constant is formed above the data line, whereby it is possible to overlap the common electrode with the data line, thereby obtaining the high aperture ratio structure.

Third, the first common line extends substantially perpendicular along the both lower sides of the data line forming the step coverage of the common electrode, to prevent alignment distortion of liquid crystal molecules at both ends of the common electrode above the data line, and light leakage at the portion corresponding to the alignment distortion of liquid crystal molecules.

Fourth, the step coverage may not be formed at the both sides of the common electrode above the data line in the method of forming the insulating layer of the low dielectric constant on the entire surface of the first insulating interlayer. As a result, it is possible to prevent the alignment distortion of the liquid crystal at the both sides of the common electrode, and the light leakage.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display (LCD) device comprising:
   first and second substrates facing each other at a predetermined distance;
   gate and data lines crossing each other on the first substrate, to define a pixel region;
   a first common line substantially parallel to the gate line;
   a thin film transistor where the gate and data lines cross;
   a first insulating interlayer on an entire surface of the first substrate including the thin film transistor;
   a second insulating interlayer on the entire surface of the first insulating interlayer;
   walls on the second insulating interlayer above the gate line and the adjacent data line, to surround the lower side of the pixel region;
   a second common line and a common electrode in the pixel region extending in one direction and overlapping the gate line, the data line, and the thin film transistor; and a pixel electrode in contact with a drain electrode of the thin film transistor and between the common electrodes at fixed intervals.

2. The LCD device of claim 1, wherein the insulating layer and the walls are formed of an organic insulating layer having a low dielectric constant, including one of photo acryl, polyimide, and BCB (BenzoCycloButene).

3. A liquid crystal display (LCD) device comprising:
    first and second substrates facing each other at a predetermined distance;
    gate and data lines crossing each other on the first substrate, to define a pixel region;
    a thin film transistor where the gate and data lines cross;
    a first insulating interlayer on an entire surface of the first substrate including the thin film transistor;
    a second insulating interlayer on the entire surface of the first insulating interlayer;
    walls above the gate line and the adjacent data line, to surround the lower side of the pixel region; and
    a pixel electrode being contact with a drain electrode of the thin film transistor within the pixel region.

4. The LCD device of claim 3, wherein the second insulating interlayer and the walls are formed of an organic insulating layer having a low dielectric constant, including one of photo acryl, polyimide, and BCB (BenzoCycloButene).

5. A method for fabricating a liquid crystal display (LCD) device comprising:
    forming a gate line having a gate electrode at one side of a substrate;
    forming a first common line substantially parallel to the gate line;
    forming a gate insulating layer on an entire surface of the substrate including the gate line;
    forming an active layer above the gate electrode;
    forming a data line substantially perpendicular to the gate line, to define a pixel region;
    forming source and drain electrodes overlapping both sides of the active layer;
    forming a first insulating interlayer on the entire surface of the substrate including the data line;
    forming a second insulating interlayer on the entire surface of the first insulating interlayer;
    forming walls above the gate line and the adjacent data line to surround the lower side of the pixel region;
    forming a second common line and a common electrode in the pixel region extending in one direction and overlapping the gate line, the data line, and the thin film transistor; and
    forming a pixel electrode in contact with a drain electrode of the thin film transistor and between the common electrodes at fixed intervals.

6. The method of claim 5, wherein the second insulating interlayer is formed on the entire surface of the first insulating interlayer including the data line by a first printing method, and the walls are formed on the second insulating interlayer by a second printing method, each wall having a height corresponding to a cell gap.

7. The method of claim 5, wherein the second insulating interlayer and the walls are formed of an organic insulating layer having a low dielectric constant, including one of photo acryl, polyimide, and BCB (BenzoCycloButene).

8. A method of fabricating a liquid crystal display (LCD) device comprising:
    forming a gate line having a gate electrode at one side of a substrate;
    forming a gate insulating layer on an entire surface of the substrate including the gate line;
    forming an active layer above the gate electrode;
    forming a data line substantially perpendicular to the gate line, to define a pixel region;
    forming source and drain electrodes overlapping both sides of the active layer;
    forming a first insulating interlayer on the entire surface of the substrate including the data line;
    forming a second insulating interlayer on the entire surface of the first insulating interlayer;
    forming walls above the gate line and the adjacent data line, to surround the lower side of the pixel region; and
    forming a pixel electrode in contact with a drain electrode of the thin film transistor within the pixel region.

9. The method of claim 8, wherein the second insulating interlayer and the walls are formed of an organic insulating layer having a low dielectric constant, including one of photo acryl, polyimide, and BCB (BenzoCycloButene).

* * * * *